(12) United States Patent
Kestle et al.

(10) Patent No.: US 6,494,703 B2
(45) Date of Patent: Dec. 17, 2002

(54) BARREL ASSEMBLY

(75) Inventors: Martin R. Kestle, Everett; Clive A. Toomey, Nobleton; Anthony Paulovic, Irishtown, all of (CA)

(73) Assignee: Husky Injection Molding Systems, Ltd., Bolton (CA)

( * ) Notice: Subject to any disclaimer, the term of this patent is extended or adjusted under 35 U.S.C. 154(b) by 14 days.

(21) Appl. No.: 09/791,373

(22) Filed: Feb. 23, 2001

(65) Prior Publication Data

US 2002/0160071 A1 Oct. 31, 2002

(51) Int. Cl.$^7$ ................................................ B29C 45/17
(52) U.S. Cl. ..................................... 425/190; 425/192 R
(58) Field of Search ............................... 425/190, 192 R

(56) References Cited

U.S. PATENT DOCUMENTS 4,680,002 A * 7/1987 Hehl ....................... 425/192 R

* cited by examiner

*Primary Examiner*—Tim Heitbrink

(57) ABSTRACT

A barrel assembly preferably having a first barrel coupler and a second barrel coupler. The first barrel coupler secures the barrel to a carriage. The second barrel coupler retains an end of the barrel in the carriage preventing rotation of the barrel during operation. The barrel section between the first barrel coupler and an end of the barrel is isolated from axial carriage force in operation.

48 Claims, 26 Drawing Sheets

BARREL ASSEMBLY

CROSS-REFERENCE TO RELATED COPENDING PATENT APPLICATIONS

The following patent applications, which are assigned to the assignee of the present invention and filed concurrently herewith, cover subject matter related to the subject matter of the present invention and are incorporated herein by reference:

Serial Number Title

09/791,651 Cradle For A Quick Barrel Change.
09/791,376 Force Isolating Cradle Assembly.
09/791,374 Injection Unit.

BACKGROUND OF THE INVENTION

1. Field of the Invention

The present invention broadly relates to injection molding machines and, in particular to the injection unit of an injection molding machine. Injection molding machines include machines for injecting plastic material, or metal material, or metal material in a thixotropic state.

2. Summary of the Prior Art

Operation of an injection molding machine introduces a number of forces, pressures, and stresses on the injection unit. For example, axial carriage force is a force applied to engage the nozzle end of a barrel assembly against a sprue bushing of a mold. This provides a force sealing connection between the nozzle and sprue bushing preventing leakage of melted material during injection. Carriage force is applied and maintained prior to injecting the melt of material.

Injection force is a force directed along the length of a reciprocating screw located in a bore of a barrel assembly. Injection force results in injecting a melt of material into a mold. There is an axial reactive injection force acting along the length of the barrel assembly as a result of moving a screw forward during the injection stage of a molding process.

Injection pressure is a pressure required to overcome the resistance to the flow of the melt of material in the nozzle, runner system, and mold cavity. Injection pressure is exerted on the melt in front of the screw tip during the injection stage of a molding process. The accumulator end of a barrel assembly must withstand injection pressure.

Injection units for molding machines are very well known. For example, the book entitled "Injection Molding machines A User's Guide $3_{rd}$ Edition" by Johannaber was published in 1994 by Carl Hanser Verlag (ISBN 1-56990-169-4) and contains a detailed description of conventional injection units for plastic injection molding machines in Chapter 3 on pages 38, 39 42, 43, 44, 75, and 76. The reciprocating screw (RS) injection unit includes a barrel assembly which includes a nozzle, barrel head, barrel, axial bore, feed port, heater bands, and thermocouples. A reciprocating screw, which includes a non-return valve, is disposed in the axial bore of the barrel. The axial bore of the barrel includes a metering section and a feeding section. An electric or hydraulic drive operates the screw to feed and meter a melt of material and inject the metered material into a mold. The barrel assembly is fixed and supported, cantilevered, at one end of the barrel by a carriage. Hydraulic or electric actuators connect between the carriage and a frame member or fixed platen of the injection molding system. Operation of the actuators move the barrel assembly towards and away from the stationary platen and provides an axial carriage force through the entire length of the barrel during injection minimizing leakage between the nozzle tip and the sprue bushing. The axial reactive injection force is directed through the entire length of the barrel during injection.

The book entitled "Injection Molding Operations" produced by Husky Injection Molding Systems Ltd., and printed in Canada, copyright 1980 also contains a description of conventional injection units for plastic injection molding machines on pages 41 through 44. Again, for the reciprocating screw injection unit, a barrel is supported at a distant end by a carriage, which houses the injection cylinder and a rotational drive. A hydraulic cylinder is connected between the carriage and a stationary platen. In operation of the hydraulic cylinder, the carriage force is applied along the entire length of the barrel. For a two stage injection unit, a barrel is supported at one end by a carriage. The carriage houses the drive. The nozzle of the barrel feeds into a shooting pot which includes an injection piston. The carriage supports another end of the shooting pot. A hydraulic cylinder is connected between the carriage and a stationary platen. In operation of the hydraulic cylinder, the carriage force is applied along the entire length of the shooting pot. The axial reactive injection force is directed through the entire length of the shooting pot during injection.

U.S. Pat. No. 5,040,589 issued on Aug. 20, 1991 to Bradley et al (assigned to The Dow Chemical Company). The patent describes an injection apparatus for injection molding a thixotropic semi-solid metal alloy. The patent contains a description of an apparatus for processing a metal feedstock into a thixotropic state as the metal is fed into a hopper, located at one end of the barrel, and transported into an accumulation zone located at another end of the barrel. The barrel is constructed of a single piece of material with thick walls. A number of heating zones are defined along the length of the barrel, including sections of the barrel having differing thickness. The feed throat area and zone 4 are relatively thick sections. Zone 3 is a slightly thinner section, and zone 2 is the thinnest section. The barrel is conventionally mounted in the injection unit. A feed throat end of the barrel is mounted in an upright support secured to the frame of an injection unit. A bottom surface of the barrel, intermediate the distant ends of the barrel, rests on a second support also secured to the frame. The carriage force is applied along the entire length of the barrel in operation of the apparatus. All sections of the disclosed barrel must be thick enough to withstand the combination of axial carriage force and axial reactive injection force directed through the entire length of the barrel during injection.

U.S. Pat. No. 5,983,978 issued on Nov. 16, 1999 to Vining et al (assigned to Thixomat Inc.). The patent describes a thixotropic metal injection molding apparatus. The barrel is formed in two sections to define a high pressure section and a low pressure section. The low pressure section is thinner than the high pressure section. A feed throat end of the barrel is mounted in an upright support of an injection unit. A bottom surface of the barrel, intermediate the distant ends of the barrel, rests on a second support also secured to the frame. The carriage force is applied along the entire length of the barrel in operation of the apparatus. All sections of the disclosed barrel must be thick enough to withstand the combination of axial carriage force and reactive injection force through the entire length of the barrel during injection.

There are a number of problems and deficiencies with the known prior art devices. Barrels are costly due to the amount of material required to provide a suitable thickness for withstanding the axial force along the entire length of the barrel. The axial force may be the carriage force, or the reactive injection force, or a combination of these two forces.

Special materials are required for barrels in use with thixotropic materials and these special materials are very expensive and are difficult to manufacture.

Thick barrels have a high thermal resistance which affects the efficiency and controllability of heating a material in the axial bore of a barrel.

Barrels, conventionally mounted in the injection unit, are typically difficult to install and remove. The process of installation and removal within a carriage is time consuming. Installation of the barrel in a carriage is further prone to alignment problems.

SUMMARY OF THE INVENTION

The primary objective of the present invention is to provide an improved barrel assembly for use in an injection molding machine.

A barrel assembly for use in an injection molding machine comprises a first barrel portion, a second barrel portion and a first barrel coupler disposed on said first barrel portion and isolating said second barrel portion from an axial force. The barrel assembly has an axial bore.

As an alternative, the first barrel coupler may include a linkage member. The first barrel coupler may include a second linkage member. The linkage member may include a thermal isolator. In an embodiment of the invention, the linkage member is a pair of standoffs. In another embodiment of the invention, the second linkage member is a ring.

As an alternative, the barrel assembly may include a second coupler disposed on the second portion of the barrel. The second coupler is adapted to cooperate with the second portion of the barrel and a second carriage coupler to permit axial movement of the barrel and prevent rotational movement of the barrel.

As an alternative, the barrel assembly may include an axial force linkage member disposed on the first coupler. The axial force linkage member distributes the axial force.

As an alternative, the barrel assembly may include a thermal isolator disposed on the first coupler. The thermal insulator reduces conductive heat transfer between the barrel assembly and a carriage.

As an alternative, the barrel assembly may include a linkage insulator disposed on the first coupler. The linkage insulator distributes the axial carriage force and reduces conductive heat transfer between the barrel assembly and the carriage. In an embodiment of the invention, the linkage insulator is an axial force linkage member and thermal isolator.

As an alternative, the barrel assembly may include a plurality of second couplers. In one embodiment of the invention, the second coupler is a recess formed in an outer surface of the second portion of the barrel. In another embodiment of the invention, the recess is a substantially flat pad. In another embodiment of the invention, the recess forms a spline. In another embodiment of the invention, the recess is an axially aligned slot.

As an alternative, the barrel assembly may include a plurality of axial force linkage members. In an embodiment of the invention, the axial force linkage member is of unitary construction formed on a surface of the first coupler. In another embodiment of the invention, the axial force linkage member is retained on the first coupler.

As an alternative, the barrel assembly may include a plurality of thermal isolators. In an embodiment of the invention, the thermal isolator is of unitary construction formed on the first coupler. In another embodiment of the invention, the thermal isolator is retained to the first coupler.

As an alternative, the barrel assembly may include a plurality of linkage insulators. In an embodiment of the invention, the linkage insulator is of unitary construction formed on a side of the first coupler. In another embodiment of the invention, the linkage insulator is retained to the first coupler.

As an alternative, the barrel assembly may include a barrel liner retained in the axial bore to isolate and protect the barrel from the melt of material.

The barrel assembly may be of unitary construction. Alternatively, the barrel assembly may be a plurality of barrel sections secured together. For the case wherein the barrel assembly is a plurality of barrel sections, each barrel section may further include a seal preventing leakage of a melt of material.

Further objects and advantages of the present invention will appear hereinbelow.

BRIEF DESCRIPTION OF THE DRAWINGS

Embodiments of the present invention will now be described, by way of example only, with reference to the attached figures, wherein.

Figure 1:
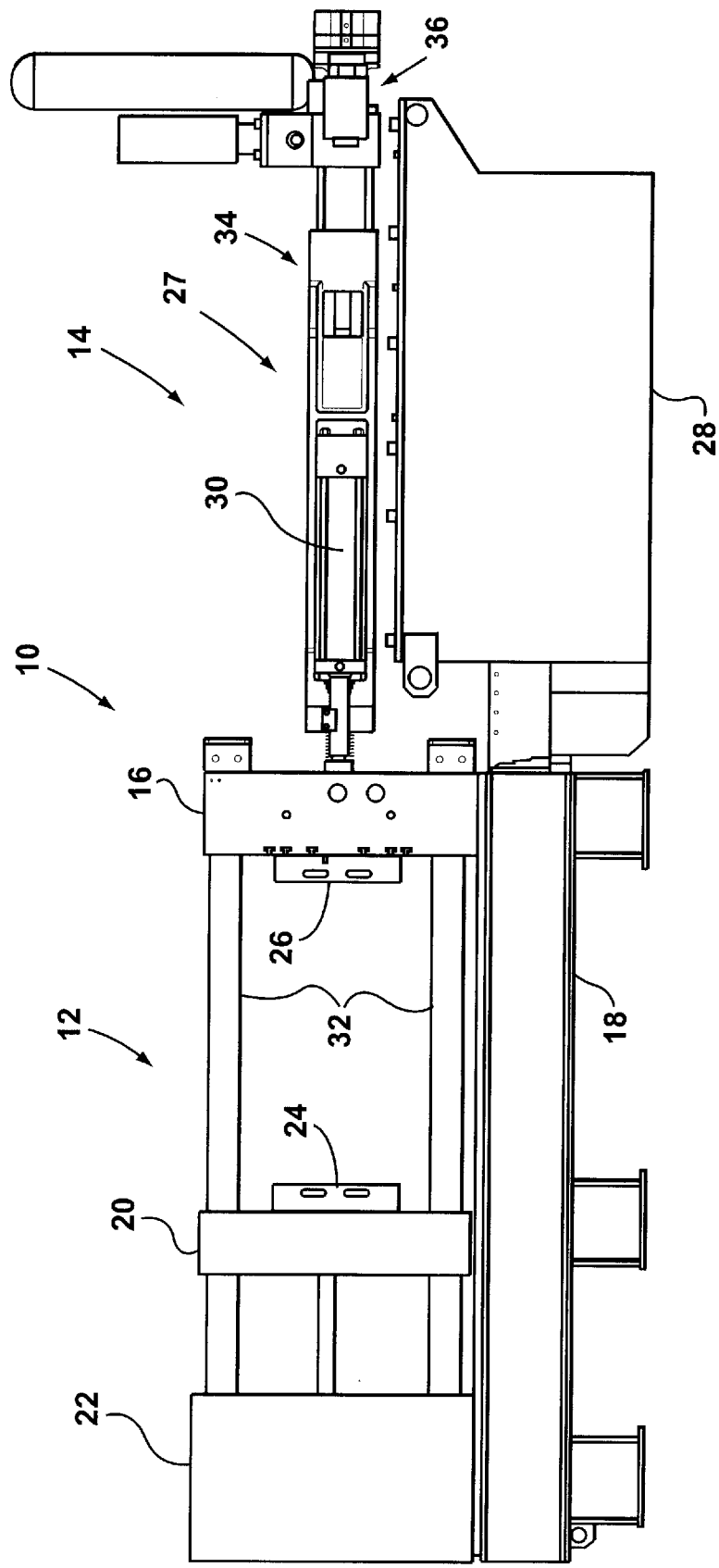
FIG. 1 is a diagrammatic side view representation of an injection molding machine illustrating a clamp unit interconnected to an injection unit.

| Nomenclature List |
|---|
| 10 Injection molding machine. |
| 12 Clamp unit. |
| 14 Injection unit. |
| 16 Stationary platen. |
| 18 Clamp frame member. |
| 20 Moving platen. |
| 22 Actuator. |
| 24 Moving half of a mold. |
| 26 Stationary half of a mold. |
| 27 Injection assembly. |
| 28 Injection unit frame. |
| 30 Barrel assembly. |
| 32 Tie bars. |
| 34 Carriage assembly. |
| 36 Drive assembly. |
| 38 Screw translation drive. |
| 40 Screw rotation drive |
| 42 Carriage actuator. |
| 44 First barrel portion. |
| 46 First barrel coupler. |
| 48 Second barrel portion. |
| 50 Yoke. |
| 51 Opening |
| 52 Cradle member. |
| 53 Opening |
| 54 Drive mount. |
| 55 Opening. |
| 56 First carriage actuator. |
| 57 Opening. |
| 58 Second carriage actuator. |
| 60 Second barrel coupler. |
| 62 Nozzle. |
| 64 Accumulator. |

| -continued |
|---|
| Nomenclature List |
| 66 Sealing joint. |
| 68 Sealing joint. |
| 70 Elongate section. |
| 72 Mounting flange. |
| 74 Bores. |
| 76 Accumulator end. |
| 78 Spigot. |
| 80 First diameter axial bore. |
| 82 First concentrator. |
| 84 Second diameter axial bore of a nozzle. |
| 86 Mold end. |
| 88 Spigot tip. |
| 90 Semispherical tip. |
| 92 Opening. |
| 94 Opening. |
| 96 Axial force linkage member. |
| 98 Thermal isolator. |
| 99 Linkage insulator. |
| 100 Bore. |
| 102 Threaded bores. |
| 104 Elongate section. |
| 108 Threaded bores. |
| 110 Second Concentrator. |
| 112 First accumulator diameter bore. |
| 114 Bore. |
| 116 Second diameter bore. |
| 118 End wall. |
| 120 First end wall. |
| 122 Bore. |
| 124 Second end wall. |
| 126 Side. |
| 128 Cylindrical connector. |
| 130 Flange. |
| 132 Bores. |
| 134 Second opening. |
| 136 Second end wall. |
| 138 Liner. |
| 140 Feed throat. |
| 142 Outer barrel. |
| 146 First opening. |
| 147 Axial bore. |
| 148 Second carriage coupler. |
| 150 Second axial force linkage member. |
| 152 First carriage coupler. |
| 153 Engagement member. |
| 155 Support surface. |
| 156 First carriage stop. |
| 158 Second carriage stop. |
| 160 Screw tip. |
| 162 Check valve. |
| 164 Reciprocating screw body. |
| 170 First carriage actuator housing. |
| 172 Second carriage actuator housing. |
| 174 First end. |
| 176 Lengthwise axial opening. |
| 178 First cradle coupler. |
| 180 Support Web. |
| 182 Upper carriage member. |
| 184 Lower carriage member. |
| 186 Support web. |
| 188 Upper carriage member. |
| 190 Lower carriage member. |
| 192 Upright wall member. |
| 194 Upright wall member. |
| 196 First support. |
| 198 First coupler member. |
| 200 Second coupler member. |
| 202 First coupling surface. |
| 204 Second coupling surface. |
| 206 Second support |
| 208 First coupling member. |
| 210 Second coupling member. |
| 212 First coupling surface. |
| 214 second coupling surface. |
| 216 Support Gussets. |
| 218 First barrel support member. |
| 220 Second barrel support member. |

-continued

Nomenclature List

222 First upright standoff.
224 Second upright standoff.
226 First upright standoff.
228 Second upright standoff.
230 Yoke mounting surface.
232 Barrel first coupler opening.
234 Mounting surface.
236 Threaded bores
238 Opening
240 Front face.
242 Back side.
244 Left side.
246 Right side.
248 Opening.
250 Central axial bore.
252 Barrel seat.
254 First yoke support.
256 Supporting surface.
258 Second yoke support.
260 Supporting surface.
262 Retaining plate.

DETAILED DESCRIPTION OF THE PREFERRED EMBODIMENTS

An embodiment of the invention is initially described referring to FIG. 1, which illustrates an injection molding machine, generally indicated at 10. The injection molding machine includes a clamp unit, indicated at 12, interconnected and secured to an injection unit, indicated at 14.

A stationary platen 16 is fixed to a clamp frame member 18 of the clamp unit 12. A moving platen 20 is operable between an open position and a closed position through an actuator 22. Those skilled in the art appreciate that the actuator 22 may be either hydraulic, electric, or a combination of hydraulic and electric actuators. A plurality of tie bars 32 extend between the stationary platen 16 and the actuator 22. A moving half of a mold 24 is mounted on a face of the moving platen 20 and a stationary half of a mold 26 is mounted on a face of the stationary platen 16.

The clamp unit 12 of FIG. 1 is a two platen clamp. Alternatively, the clamp unit 12 may be a multi-station clamp unit, for example a stack mold carrier, having more than one moving platen and more than one mold. Alternatively, the clamp unit 12 may be an index clamp unit having a rotating multi-face turret block in place of a moving platen. Alternatively, the clamp unit 12 may be a tandem clamp unit having two molds operated in sequence.

An injection assembly 27 is mounted on a injection unit frame 28 of the injection unit 14. The frame 28 typically houses the control system, electronics, and power pack. The injection assembly 27 further includes a barrel assembly 30, a carriage assembly 34 for supporting and securing the barrel assembly 30, and a drive assembly 36. The drive rotates a screw to create a melt of material and feed the material forward in the barrel into an accumulation zone. The drive also reciprocates the screw to inject the melt of material into the mold.

Figure 2:
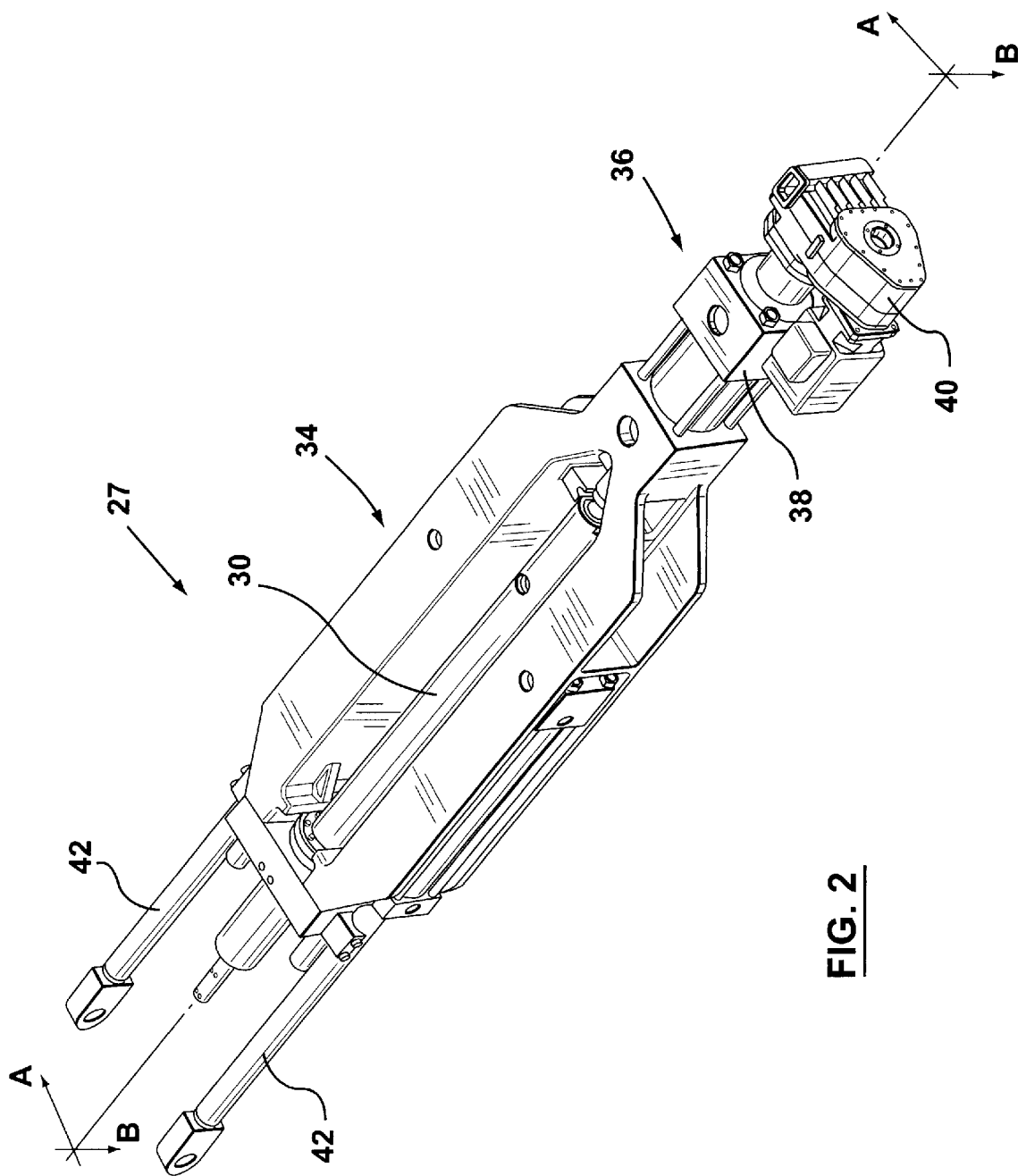
FIG. 2 is a perspective view of an injection assembly.

Referring now to FIG. 1 and FIG. 2, the drive assembly 36 is further described. In an embodiment of the invention, the drive assembly includes both hydraulic and electric components. A screw translation drive 38 provides axial movement of the screw (not shown) in the barrel assembly 30. A screw rotation drive 40 rotates the screw (not shown) within the barrel assembly 30. The screw translation drive 38 is hydraulic and the screw rotation drive 40 is electric. Alternatively, the drive could be completely hydraulic or completely electric. Activation of the translation drive 38 axially reciprocates the screw without rotation of the screw by the screw rotation drive 40.

The barrel assembly 30 is mounted and securely retained within the carriage assembly 34. The carriage actuator 42 extends between the carriage assembly 34 and the stationary platen (see FIG. 1). Operation of the carriage actuator 42 moves the injection assembly 27 towards and away from the stationary platen for locating the end of a nozzle into contact with a sprue bushing.

Figure 3:
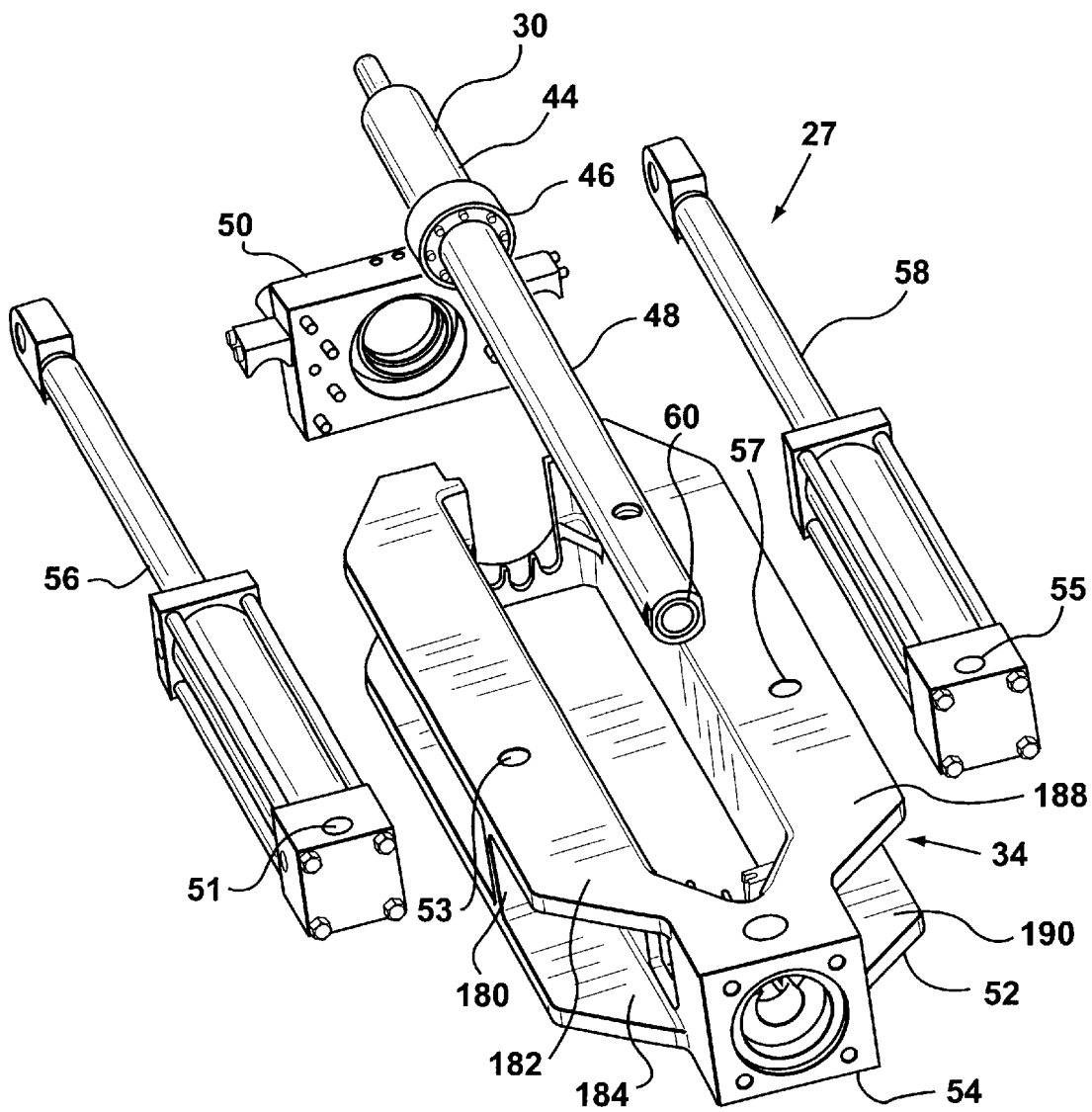
FIG. 3 is an exploded perspective view of the injection assembly illustrating a barrel assembly and a carriage assembly.

Referring now to FIG. 3, the injection assembly 27 is further described. The carriage assembly 34 includes a cradle member 52, a yoke 50, and a drive mount 54 for mounting the drive assembly 36 (see FIGS. 1 and 2).

The barrel assembly 30 includes a first barrel portion 44, a first barrel coupler 46, a second barrel portion 48, and a second barrel coupler 60. The first barrel coupler 46 is disposed on the barrel assembly 30 and interlocks with first carriage coupler to secure the barrel assembly 30 in the carriage assembly 34. The first carriage coupler is formed intermediate the yoke 50 and an end of the cradle member 52 to be described later.

The location of the first barrel coupler 46 defines a first barrel portion 44 and a second barrel portion 48 of the barrel assembly 30. The first barrel portion 44 is a section of the barrel that is capable of withstanding injection pressure. The second barrel portion 48 is a section of the barrel that is isolated from axial forces, both the axial carriage force and the axial reactive injection force.

The second coupler 60 is disposed on the second barrel portion 48 and communicates with a second carriage coupler located at another end of the cradle member 52, near the drive mount 54, retaining the second portion 48 of the barrel assembly 30 in the cradle assembly 34. Alternatively the second coupler 60 may be disposed between the first barrel coupler 46 and an end of the second barrel portion 48.

The carriage actuator 42 includes a pair of hydraulic actuators indicated as 56 and 58. One end of the first carriage actuator 56 connects to one side of the carriage assembly 34 through a conventional fastener such as a pin (not shown) through the openings 51 and 53. The other end of the first carriage actuator 56 connects to the stationary platen (see FIG. 1). One end of the second carriage actuator 56 connects to a second side of the carriage assembly 34 through another conventional fastener such as a pin (not shown) through the openings 55 and 57. The other end of the second carriage actuator 58 connects to the stationary platen (not shown).

Figure 4:
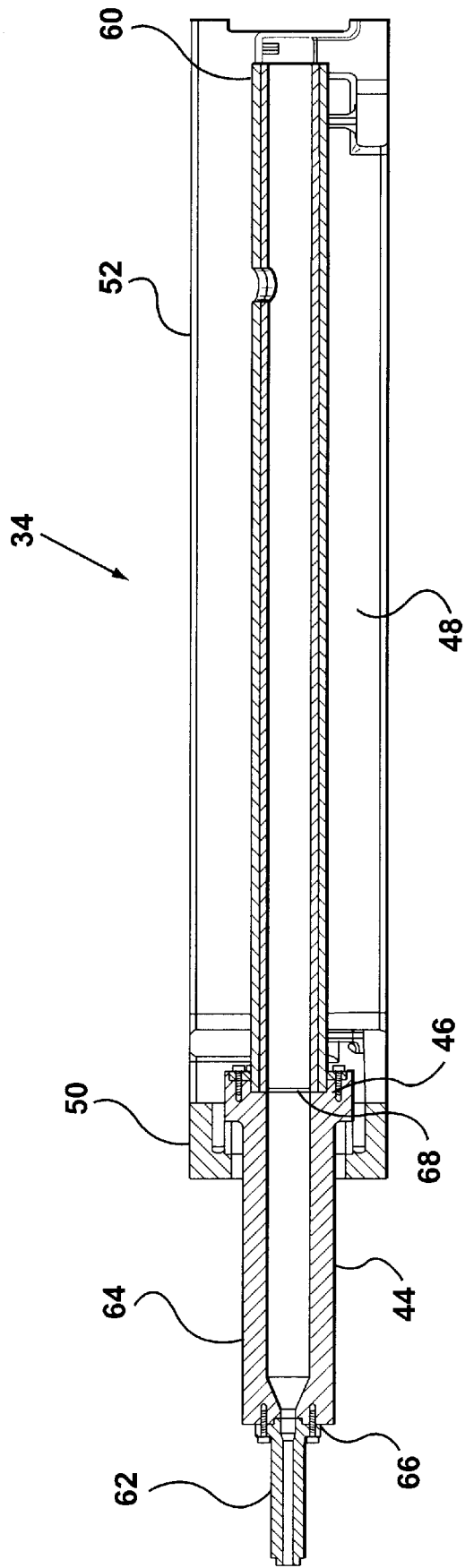
FIG. 4 is a cross sectional view taken along line AA from FIG. 2 illustrating a multi-piece barrel assembly located in the carriage assembly.

Referring now to FIG. 4, a cross sectional view of the barrel assembly 30 is now further described. The barrel assembly 30 is shown mounted within the carriage assembly 34. The barrel assembly 34 includes the first barrel portion 44 and the second barrel portion 48. The first barrel coupler 46 is disposed on the barrel assembly 30 and defines the boundary between the first barrel portion and the second barrel portion. The second barrel coupler 60 is disposed at an end on the second barrel portion 48. In this embodiment, the first barrel coupler 46 is integrally formed on the first barrel portion 44 and the second barrel coupler 60 is formed onto the outer surface of the second barrel portion 48.

The first barrel portion 44 includes a nozzle 62 and an accumulator 64. The nozzle 62 is mechanically secured by a plurality of fasteners to an end of the accumulator 64. The nozzle 62 seals at the joint 66 with the end of the accumulator 64 preventing leakage of melted material. An axial bore of the nozzle 62 aligns with an axial bore of the accumulator 64 permitting a flow of melt during injection. Alternatively, the nozzle 62 is of unitary construction with the barrel assembly 30.

The second barrel portion 48 is a feed section and is mechanically secured by a plurality of fasteners to another end of the accumulator 64. The second barrel portion 48 seals at the joint 68 at the other end of the accumulator 64. An axial bore of the second barrel portion 48 aligns with the axial bore of the accumulator permitting a flow of melt from the second barrel section 48 to the accumulator 64. In an alternative embodiment of the invention, the first barrel portion 44 and the second barrel section 48 are of unitary construction without the joints 66 and 68.

Figure 5:
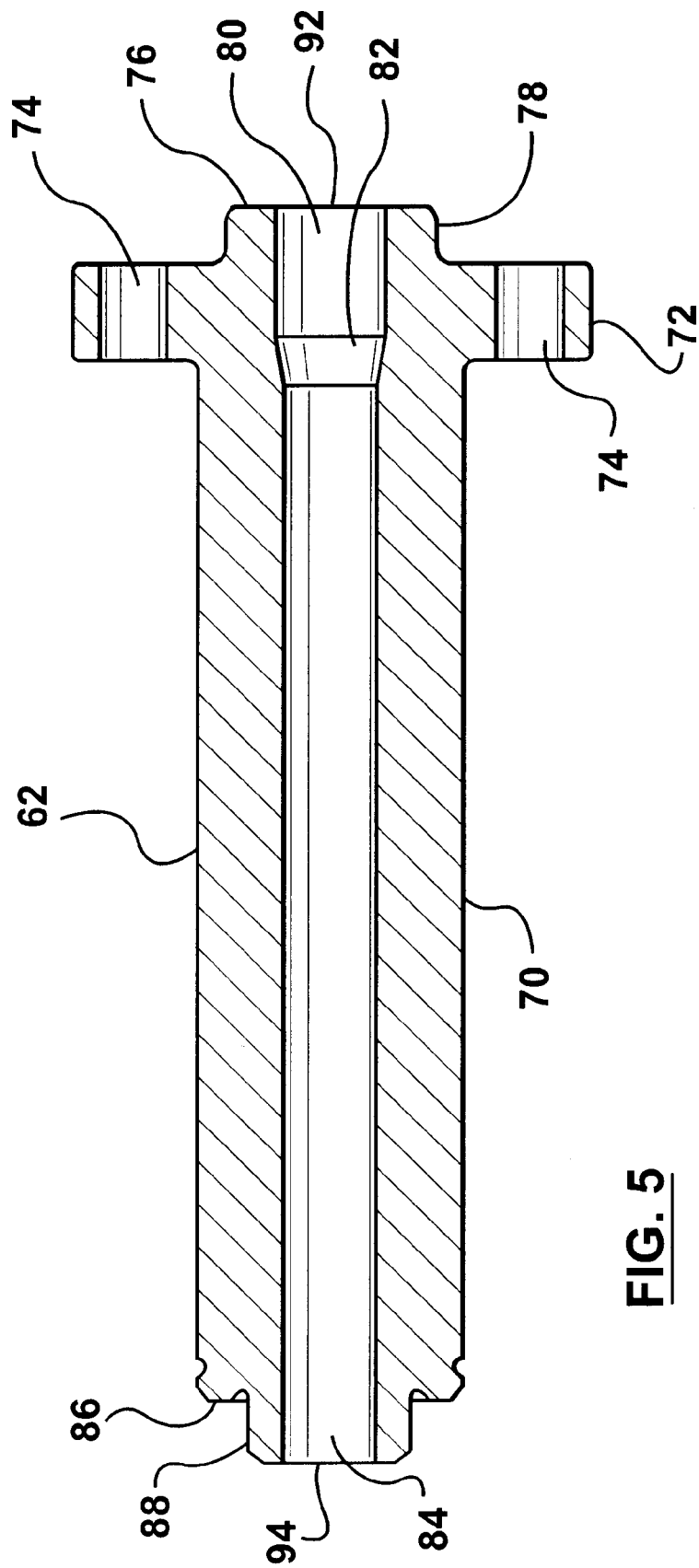
FIG. 5 is a cross sectional view taken along line AA from FIG. 2 illustrating a nozzle section with a spigot tip.
Figure 6:
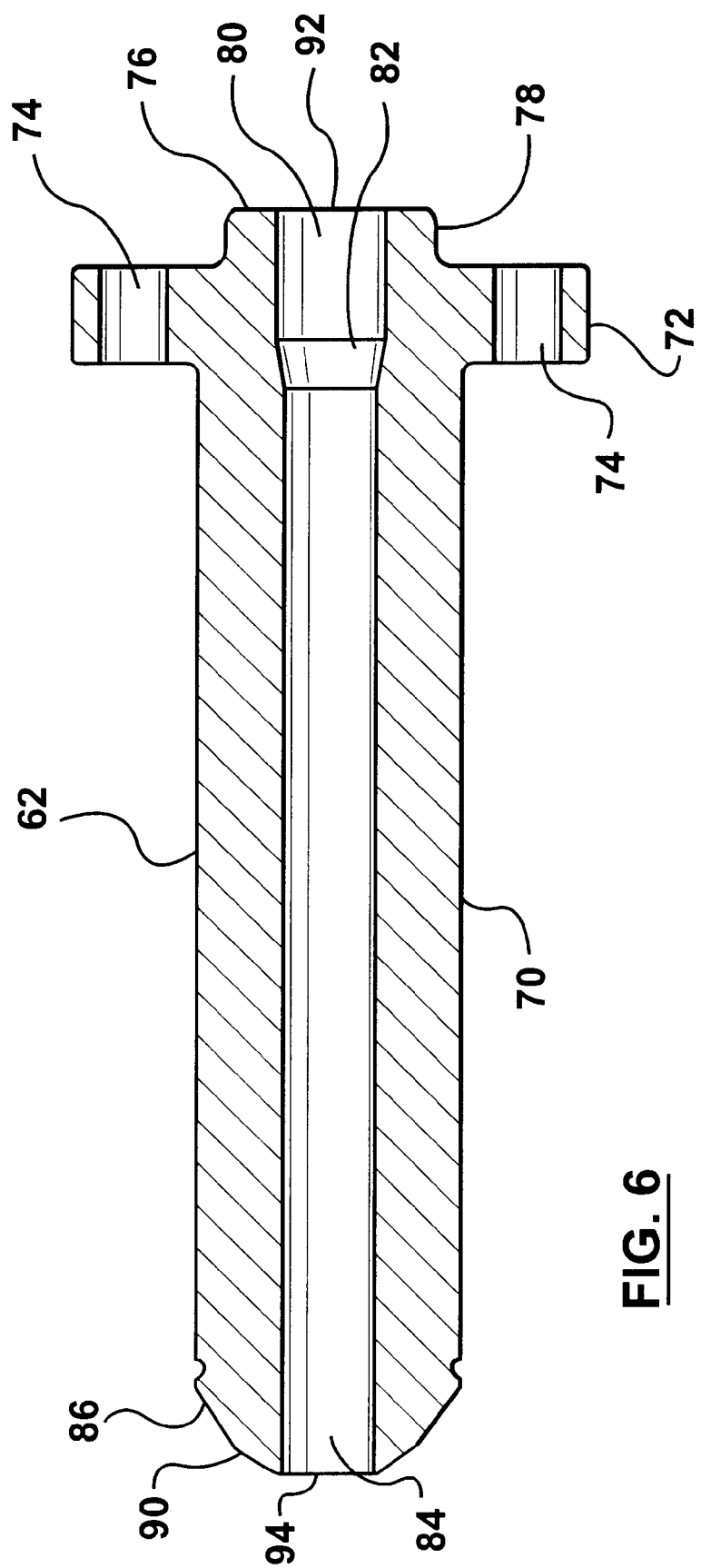
FIG. 6 is a cross sectional view taken along line AA from FIG. 2 illustrating an alternative nozzle section with a semispherical tip.

Referring now to FIGS. 5 and 6, two embodiments of a nozzle 62 are described. The nozzle 62 has an elongate cylindrical section 70 extending from a mounting flange 72 to a mold end 86 of the nozzle 62. The mounting flange 72 is cylindrical and formed integral to the elongate cylindrical section 70. The mounting flange 72 has a diameter greater than the elongate section 70. The mounting flange 72 includes a plurality of spaced apart bores 74 for receiving mounting bolts (not shown). The accumulator end 76 of the nozzle 62 includes a spigot seal 78. The spigot seal 78 is cylindrical and extends outwardly from a side of the flange 72. The nozzle 62 includes a melt channel made up of a first diameter axial bore 80, a first concentrator 82, and a second diameter axial bore 84. In operation during injection, the melt channel receives the melt from the accumulator through the opening 92. The melt travels along the melt channel in the nozzle 62 and exits the nozzle at another opening 94 en route to a mold.

In a first embodiment of the nozzle 62, the mold end 86 includes a spigot tip 88. The spigot tip 88 is cylindrical and extends into a complimentary cylindrical bore in a sprue bushing (not shown) for tight sealing engagement between the mold end 86 of the nozzle 64 and the sprue bushing during injection of a melt of material. In operation, the spigot tip 88 is in sliding sealing engagement with the complimentary cylindrical bore in the sprue bushing. The spigot tip 88 is permitted to move with respect to the sprue bushing.

In a second embodiment of the nozzle 62, the mold end 86 includes a convex semispherical tip 90. The semispherical tip 90 engages a complimentary concave semispherical opening in a sprue bushing (not shown) for tight sealing engagement between the mold end 86 of the nozzle 64 and the sprue bush during injection of a melt of material. In operation, the semispherical tip 90 is in force sealing engagement with the complimentary concave semispherical opening in the sprue bushing.

Figure 7:
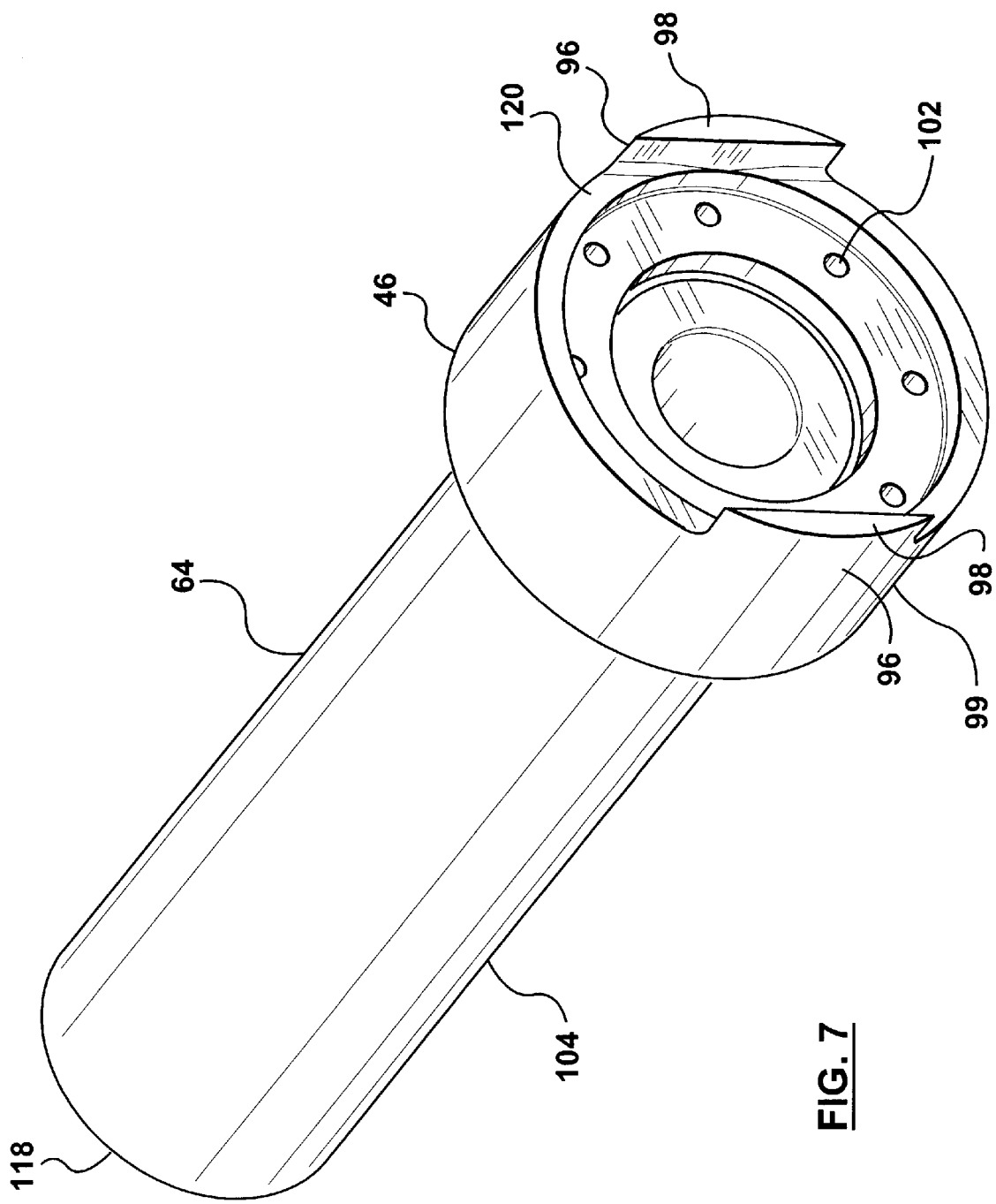
FIG. 7 is a perspective view illustrating an accumulator section of the barrel assembly and a first barrel coupler.
Figure 8:
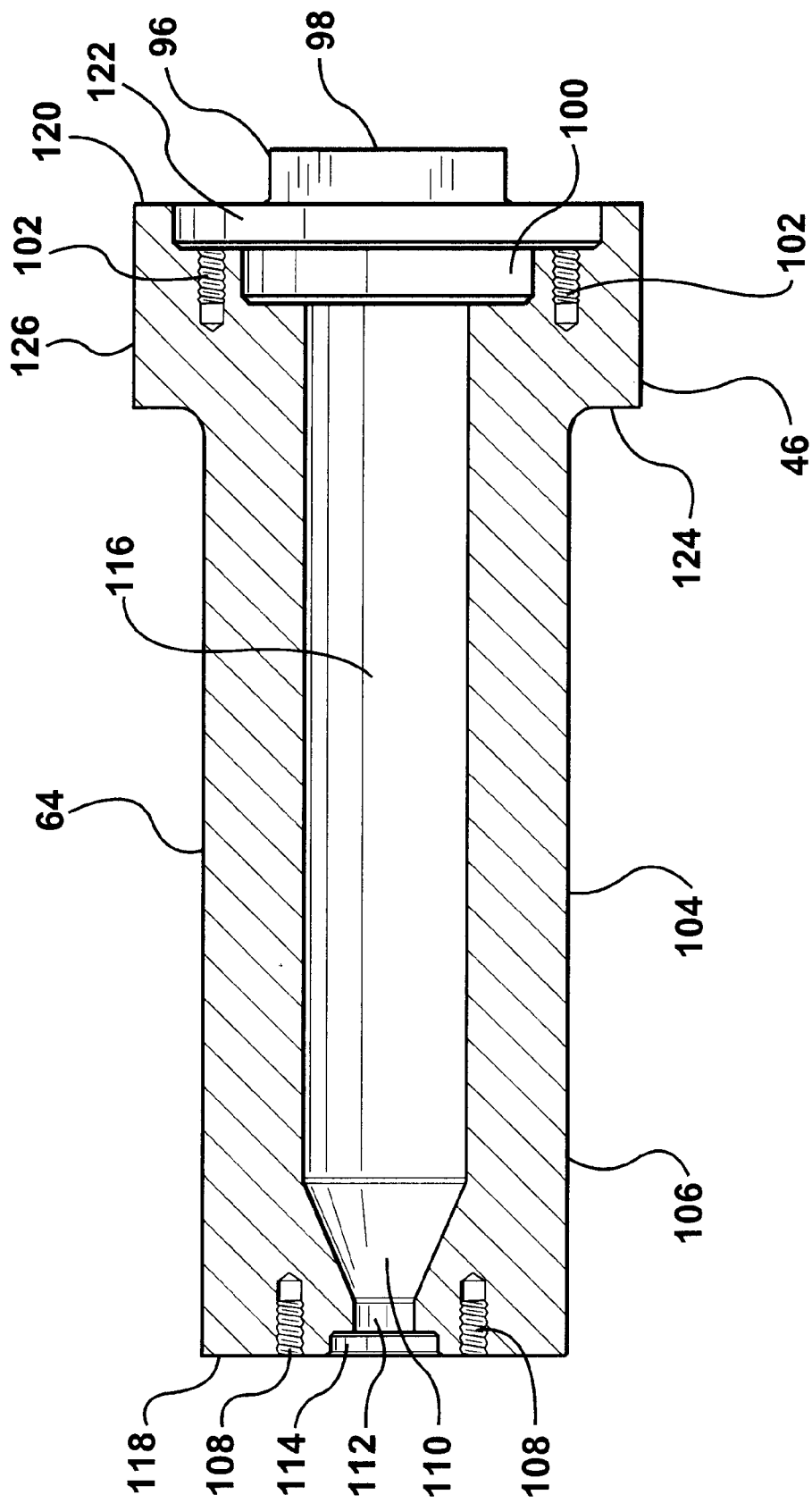
FIG. 8 is a cross sectional view taken along line AA from FIG. 2 illustrating an accumulator section of the barrel assembly and a first barrel coupler.

Referring now to FIGS. 7 and 8, an accumulator section, generally indicated as 64 is described. The accumulator includes an elongate section 104, and a first barrel coupler 46. In an embodiment of the invention, the coupler 46 includes an axial force linkage member, indicated as 96, and a thermal isolator, indicated as 98. Alternatively, the coupler 46 may include a linkage insulator 99 which is an axial force linkage member 96 integrated with a thermal isolator 98. An axial melt channel extends through the accumulator 64. The axial melt channel includes a first accumulator diameter bore 112, a second concentrator 110, and a second diameter bore 116. The first accumulator diameter bore 112 aligns and connects with the first diameter bore 80 of the nozzle 62. The second diameter bore 116 aligns and connects with an axial bore 147 of the second barrel portion 48 (not shown). The volume defined by the second diameter bore 116 (which defines an accumulation zone) determines the maximum available shot size for injection into a mold.

The accumulator 64 is substantially cylindrical with a suitable wall thickness (between the outer surface of the elongate section 104 and the melt channel) to withstand high pressure due to injection and reactive injection force. In an embodiment of the invention, the wall thickness of the accumulator 64 must also withstand axial carriage force.

The nozzle 62 connects to an end wall 118 of the accumulator 64 through the flange 72 of the nozzle 62. The end wall 118 of the accumulator 64 includes a plurality of threaded bores 108. The flange 72 of the nozzle 62 includes a corresponding plurality of bores 74. Bolts interconnect the nozzle 62 to the accumulator 64 by the bores 74 and threaded bores 108. The bore 114 in the accumulator 64 is of complimentary diameter to tightly receive the spigot 78 of the nozzle for sealing engagement between the nozzle 62 and the accumulator 64 Alternatively, a seal may be installed to prevent leakage between the nozzle 62 and the accumulator 64. Heater bands are conventionally secured to an outer surface of the accumulator 64 and the side 126 of the coupler 46.

In an embodiment of the invention, the coupler 46 is integrally formed on an end of the accumulator 64. Alternatively, the coupler 46 may be a separate component retained or secured to the accumulator 46. For example, the coupler 46 may be welded to the outer surface of the accumulator 64, or threaded to the accumulator 64. Those skilled in the art will appreciate that any retained or secured connection must be designed to withstand axial forces.

In an embodiment of the invention, the coupler 46 includes an axial force linkage member 96. For the embodiment illustrated, the axial force linkage member 96 is a pair of outwardly extending members integrally formed on the first end wall 120 of the coupler 46. Alternatively, the axial force linkage member 96 may be a plurality of outwardly extending members, or a plurality of standoff posts, or a cylindrical ring member that may be integral or separate from the coupler 46. In another embodiment of the invention, the coupler 46 includes a pair of axial force linkage members (150, 96, see FIG. 21 and FIG. 23) disposed on the first end wall 120 and the second wall 124 of the coupler 46.

Those skilled in the art will appreciate that the cross sectional area of the force linkage member 96 of the coupler 46 is such to withstand the required axial forces. In addition, placement of the axial force linkage member 96 is such to provide an even symmetrical load distribution.

Alternatively, the coupler 46 may include a second axial force linkage member (or linkage insulator) located on a second end wall 124 of the coupler 46.

In an embodiment of the invention, the axial force linkage member 96 includes a thermal isolator, generally indicated as 98. For the embodiment illustrated, the thermal isolator 98 is integrally formed on an end of the axial force linkage member 96. By minimizing the cross sectional area of the linkage member 96 for contact with a first carriage coupler (not shown) in the cradle member 52. In operation, the thermal isolator reduces the conductive heat transfer from the hot accumulator 64 and the coupler 46 to the cradle member 52 and the yoke 50. Alternatively, the thermal isolator may be separate from the axial force linkage member 96, or may be a coating, or may be a different material for reducing the conductive heat transfer. The thermal isolator is disposed intermediate all contacting surfaces between the first barrel coupler 46 and the first carriage coupler. Those skilled in the art will appreciate that the thermal isolator is such to withstand the required axial forces.

The nozzle 62 and the accumulator 64 together form the first barrel portion 44 of the barrel assembly. The first barrel portion 44 optionally includes a liner or protective coating to protect the melt channel from abrasive and corrosive materials.

Figure 9:
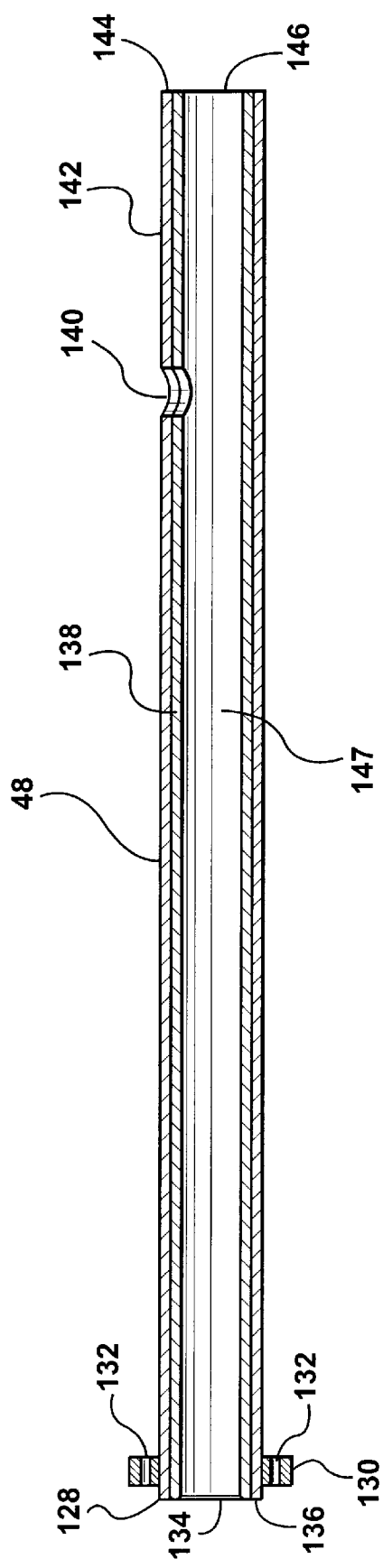
FIG. 9 is a cross sectional view taken along line AA from FIG. 2 illustrating a second portion of the barrel assembly.
Figure 10:
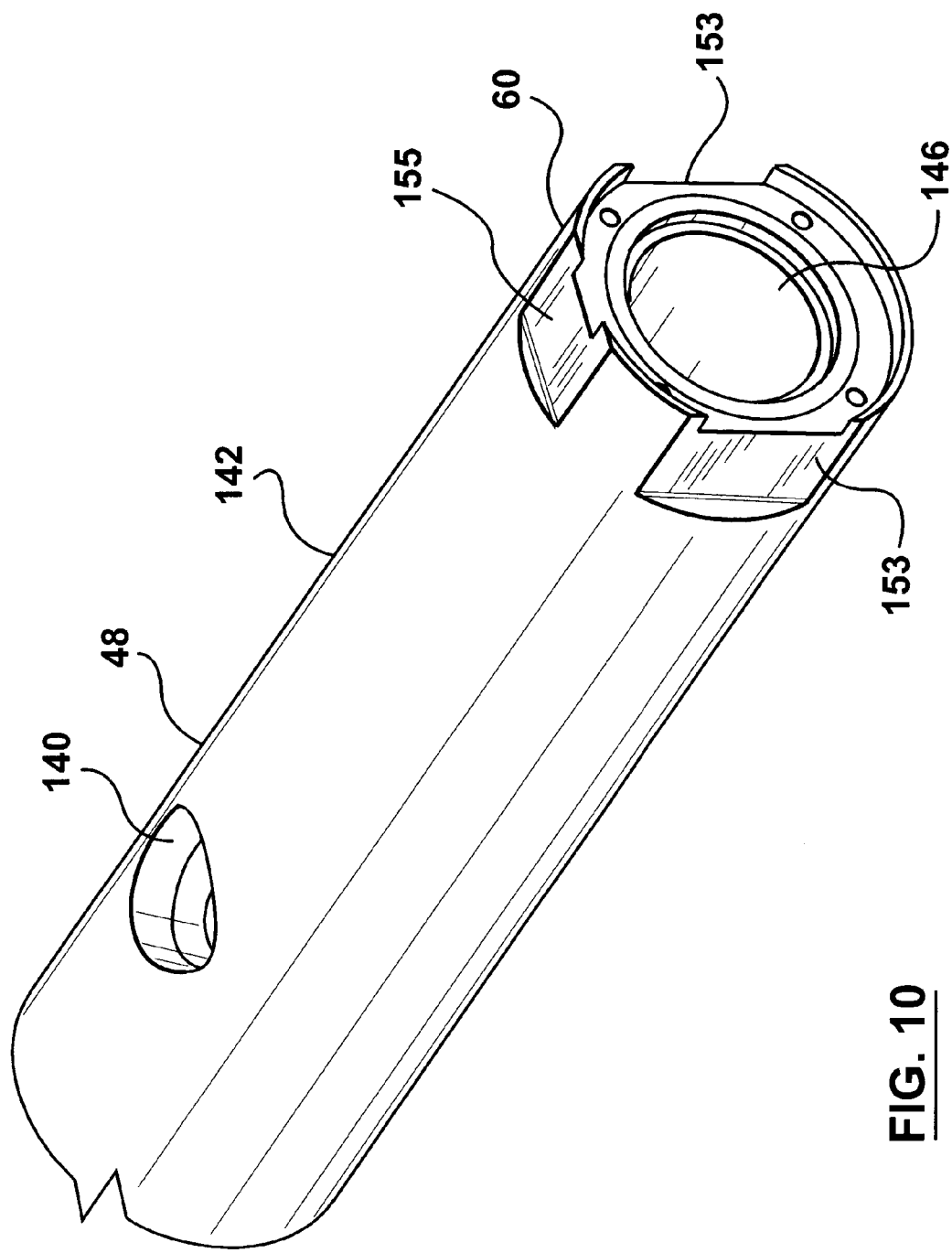
FIG. 10 is a partial perspective view of a second portion of the barrel assembly illustrating a second barrel coupler.

Referring now to FIGS. 9 and 10, a second barrel portion 48 is described. The second barrel portion 48 shown is a feed section of the barrel assembly 30 and includes an axial bore 147, a first opening 146, a second opening 134, and a feed throat 140. Material enters the second portion 48 through the feed throat 140. A screw (not shown) disposed in the axial bore 147 conveys the material forward in the axial bore 147 towards accumulator 64.

The second barrel portion 48 is substantially cylindrical with a suitable wall thickness (between the outer surface of the elongate barrel and the axial bore 147 acting as a melt channel) to withstand pressure developed due to compacting and sheering the feed material. Axial forces are not directed through the second barrel portion 48.

The second barrel portion 48 optionally includes a liner 138 installed within an outer barrel 142 to protect the barrel from abrasive and corrosive materials.

The opening 146 permits the installation and removal of a screw (not shown) within the axial bore 147.

The second end wall 136 of the second portion 48 connects to the coupler side of the accumulator 64 through the flange 130. The end wall 120 of the coupler 46 includes a plurality of threaded bores 102. The flange 130 of the second portion 48 includes a corresponding plurality of bores 132. Bolts interconnect the second portion 48 to the coupler 46 by the bores 132 and thread bores 102. The bore 100 in the coupler 46 is of complimentary diameter to tightly receive the cylindrical connector 128 of the second portion 48 for sealing engagement between the coupler 46 and the second portion 48. The bore 122 in the coupler 46 is of complimentary diameter to receive the flange 130. Alternatively, a seal may be installed to prevent leakage between the first portion and the second portion 48. The second diameter bore 116 of the accumulator 64 axially aligns with the axial bore 147 of the second portion 48.

A second barrel coupler 60 is formed on an end of the second portion 48. The second barrel coupler 60 includes at least one engagement member, indicated as 153 for complimentary engagement with a cradle engagement member for preventing rotational movement of the barrel assembly 30 during operational rotation of the screw (not shown). Heater bands are conventionally secured to an outer surface of the second barrel portion 48.

In the embodiment illustrated, the engagement member 153 is a flat recess machined on the outer surface of the barrel. Alternatively, the engagement member 153 may be an outwardly projecting member, or a groove, or a slot, or splined. Optionally, another recess 155 engages a removal plate (not shown) for preventing the barrel assembly from tipping forward when released from the cradle assembly and aligning the second barrel section vertically with the drive assembly.

In an application of the machine where the melt of material is a metal in a thixotropic state, for example, magnesium, the nozzle 62 may be made from DIN 2888 or DIN 2999. The accumulator 44 and first barrel coupler 68 (including the axial force isolator) may be made from Inconel 718 with a Stellite 12 liner. The second portion 48 may be also made from Inconel 718 with a Stellite 12 liner.

In an application of the machine where the melt of material is plastic, the nozzle 62 may be made from SAE 4140 steel with an H13 tip. The accumulator 44 and first barrel coupler 68 (including the axial force isolator) may be made from 4140 with a cast liner. The second portion 48 may be made from 4140 with a cast liner.

The nozzle 62, accumulator 44, first barrel coupler 68, and second portion 48 may be machined from a billet of material, or alternatively, they may be formed by a hot isostatic pressing (HIP) process and then machined.

Figure 11:
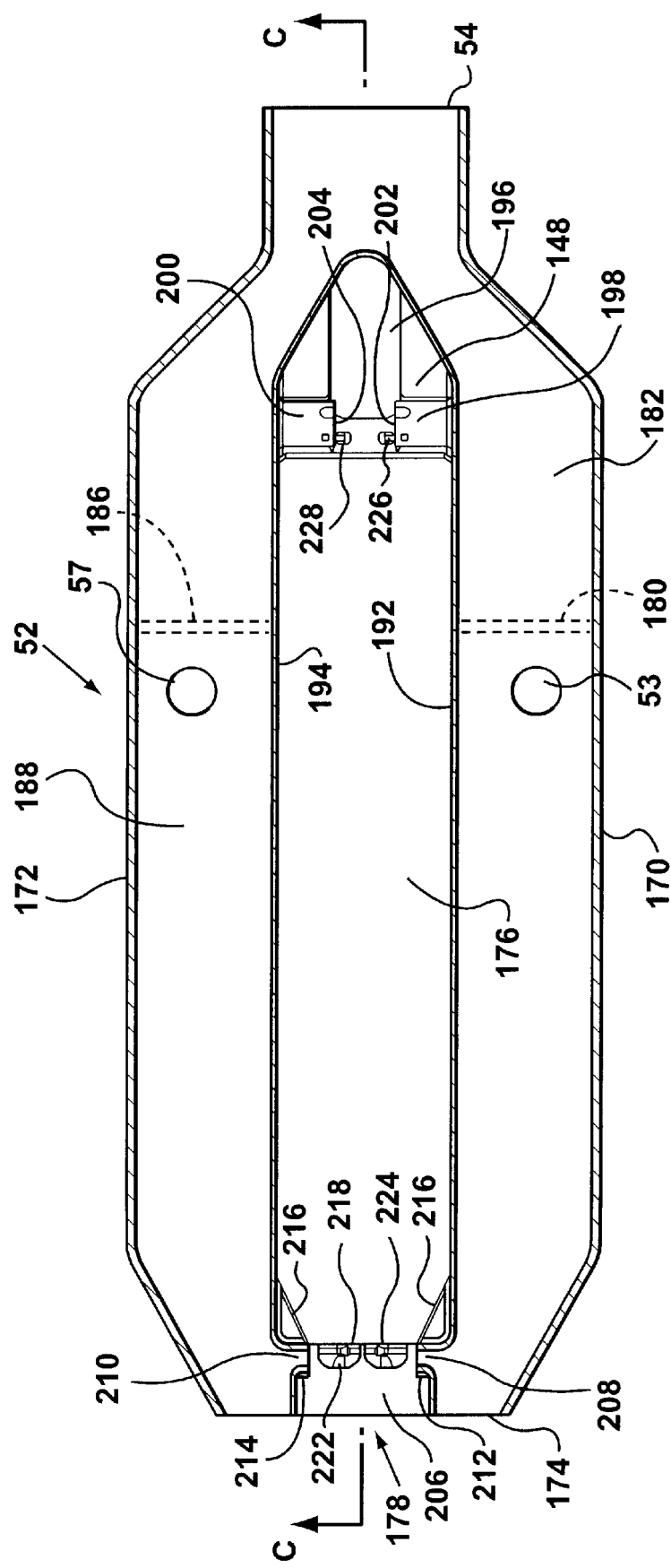
FIG. 11 is a top view of cradle member.

Referring now to FIGS. 3 and 11, the cradle member 52 of the carriage assembly 34 is further described. The cradle member 52 is substantially rectangular as shown in the top view of FIG. 11. A first cradle coupler 178 is formed on one end of the cradle member 52. A drive mount 54 is formed on a second end of the cradle member 52. The drive mount 54 includes an axial bore to connect the drive assembly to an end of a screw located in an axial bore of a barrel (not shown). The first cradle coupler 178 and the drive mount 54 are aligned about a longitudinal axis of the cradle member 52.

The first cradle coupler 178 and the drive mount 54 are interconnected by a first carriage actuator housing 170 and a second carriage actuator housing 172.

The first carriage housing 170 forms a lengthwise U-shaped rectangular channel for housing a first carriage actuator 56. The first carriage housing 170 includes a support web 180 located near an end of the first carriage housing 170 and extends between an upper carriage member 182 and a lower carriage member 184. An upright wall member 192 connects the upper carriage member 182 and the lower carriage member 184.

The second carriage housing 172 forms a second lengthwise U-shaped rectangular channel for housing a second carriage actuator 58. The second carriage housing 172 includes a support web 186 located near an end of the second carriage housing 172 and extends between an upper carriage member 188 and a lower carriage member 190. A second upright wall member 194 connects the upper carriage member 188 and the lower carriage member 190.

The cradle member 52 has a lengthwise axial opening 176 extending from the first end 174 of the cradle member 52 to the drive mount 54. This opening provides clear unobstructed access for inserting and removing a barrel assembly (see FIG. 3) within the cradle member 52.

Figure 12:
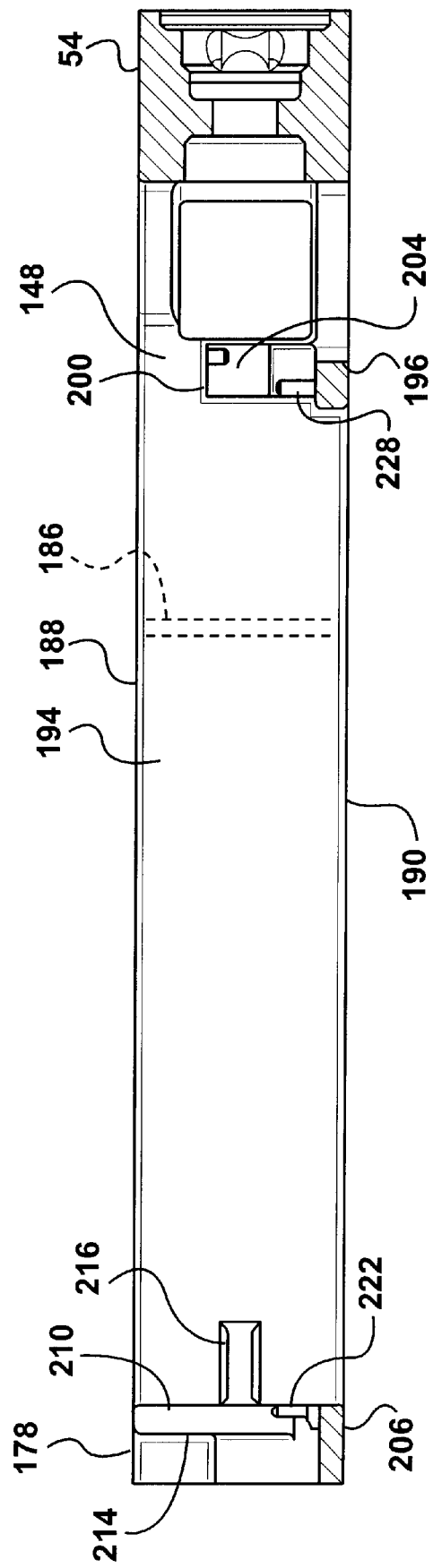
FIG. 12 is a cross sectional side view of the cradle member taken along line C—C of FIG. 11 illustrating the first carriage coupler, the second carriage coupler, the first barrel support member, and the second barrel support member.

Referring now to FIG. 11 and FIG. 12, the first cradle coupler 178 and the second carriage coupler 148 are further described.

The cradle member 52 includes a second support 206 that extends between the upright wall members (192, 194) at the first end 174 of the cradle member 52. In an embodiment of the invention, a first cradle coupler 148 includes a first coupling member 208 and a second coupling member 210. The first and second coupling members (208, 210) extend outwardly from the upright wall members (190, 192). The first coupling member 208 includes a first coupling surface 212 and the second coupling member 210 includes a second coupling surface 214. The first cradle coupler 178 forms an opening about the longitudinal axis to receive the first barrel coupler 46. In an embodiment of the invention, the first coupling surface 212 and the second coupling surface 214 engage the axial force linkage member 96 the barrel coupler 60. Alternatively, the first coupling surface 212 and the second coupling surface 214 engage the thermal isolator 98. A pair of support gussets 216 extend between a back surface of the first and second coupling members (208, 210) and the upright wall members (192, 194).

The cradle member 52 also includes a first support 196 that extends between the upright wall members (192, 194) and the drive mount 54. The first support 196 is T shaped. In an embodiment of the invention, the second carriage coupler 148 includes a first coupler member 198 and a second coupler member 200. The first and second coupler members (198, 200) extend upwardly from an upper surface first support 196 and outwardly from the upright wall members (192, 194). The second carriage coupler 148 forms a opening about the longitudinal axis to receive the second barrel coupler 60. A first coupling surface 202 and a second coupling surface 204 engage complimentary surfaces (153) of the second barrel coupler 60.

A first barrel support member 218 is formed on an upper surface of the second support 206. The first barrel support member 218 includes a first upright standoff 222 and a second upright standoff 224. The standoffs (222, 224) are of a height above the upper surface of the second support 206 to engage an outer surface of the barrel assembly 30 for locating the first barrel coupler 46 with respect to the first cradle coupler 178.

A second barrel support member 220 is formed on an upper surface of the first support 196. The second barrel support member 220 includes a first upright standoff 226 and a second upright standoff 228. The standoffs (226, 228) are of a height about the upper surface of the second first support 196 to engage an outer surface of the barrel assembly 30 for locating the second barrel coupler 60 with respect to the second carriage coupler 148.

The first barrel support member 218 and the second barrel support member 220 form a barrel alignment member and axially align the barrel assembly 30 when housed in the cradle member 52. The cradle member 52 may include additional barrel support members.

Figure 13:
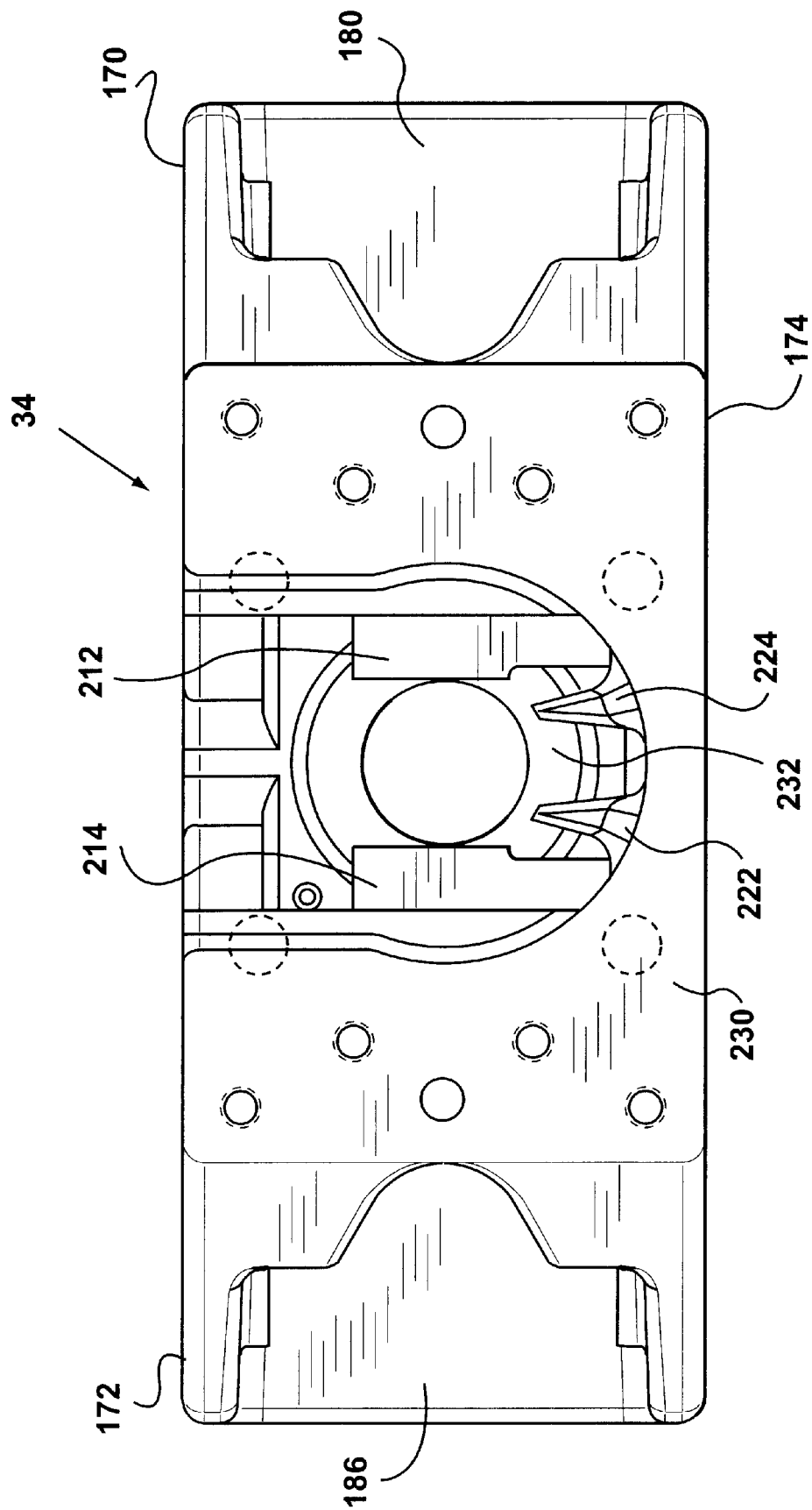
FIG. 13 is a front view of the cradle member illustrating the first cradle coupler and the first barrel support member.

Referring now to FIG. 13, the first end 174 and first cradle coupler 178 of the cradle member 52 are described. A yoke mounting surface 230 extends between the first carriage housing 170 and the second carriage housing 172. The yoke mounting surface 230 includes a number of threaded bores for receiving bolts to secure the yoke 50 to the cradle member 52. The first upright standoff 222 and the second upright standoff 224 are spaced apart a distance to securely support an outer surface of the barrel assembly 30. The cross sectional area of the first coupling surface 212 and the second coupling surface 214 is selected to withstand and distribute axial carriage force to the first barrel coupler 46. The first barrel coupler 46 fits into the barrel coupler opening, generally indicated as 232.

Figure 14:
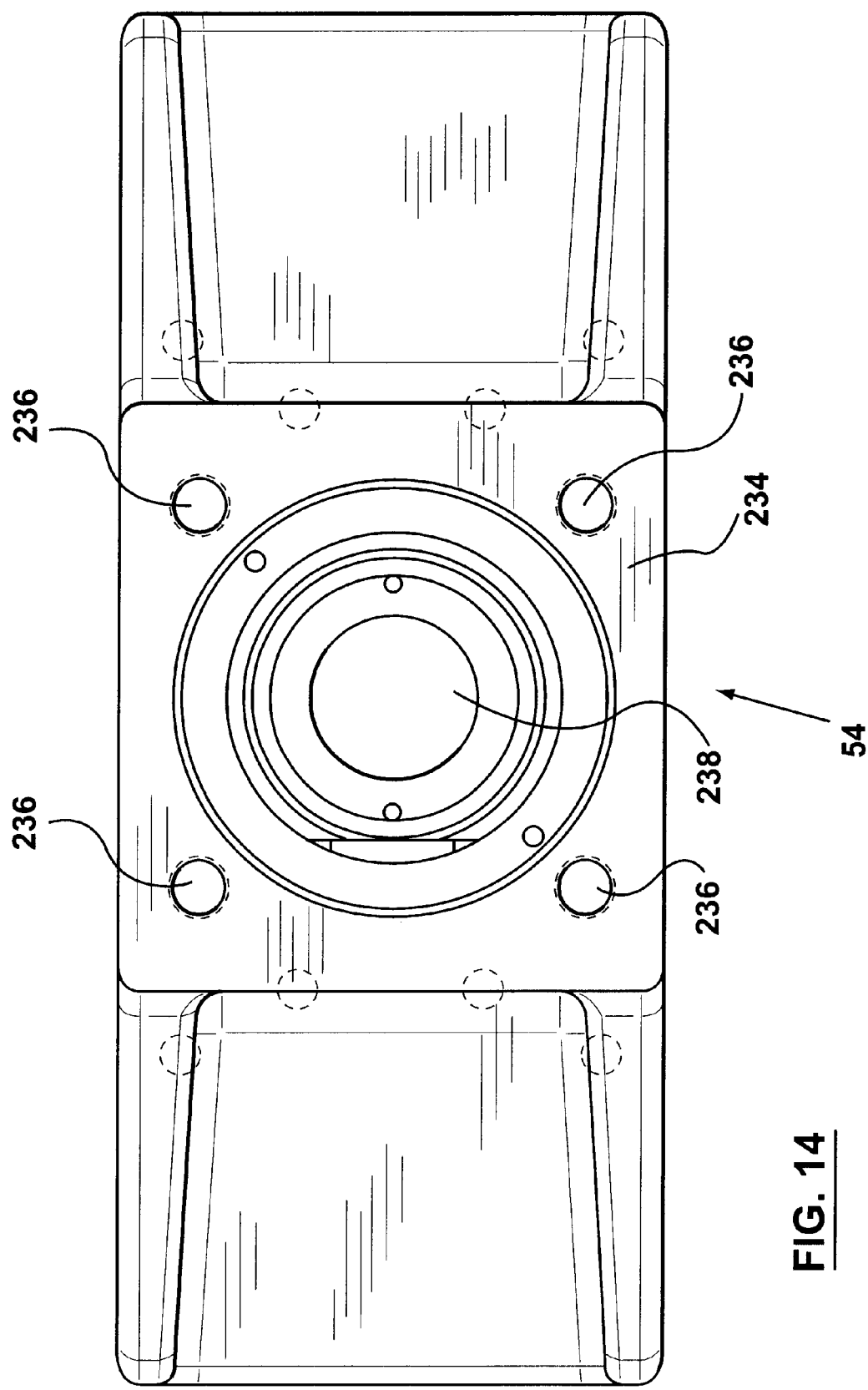
FIG. 14 is an end view of the cradle member illustrating the drive mount.

Referring now to FIG. 14, the drive mount 54 of the cradle member 52 is further described. The drive mount 54 includes a mounting surface 234 for mounting a drive assembly 36. A number of thread bores 236 are provided to receive bolts for mounting the drive assembly 36 to the drive mount 54. A opening 238 is provided to connect the drive assembly 36 to an end of a screw mounted in a barrel (not shown).

Figure 15:
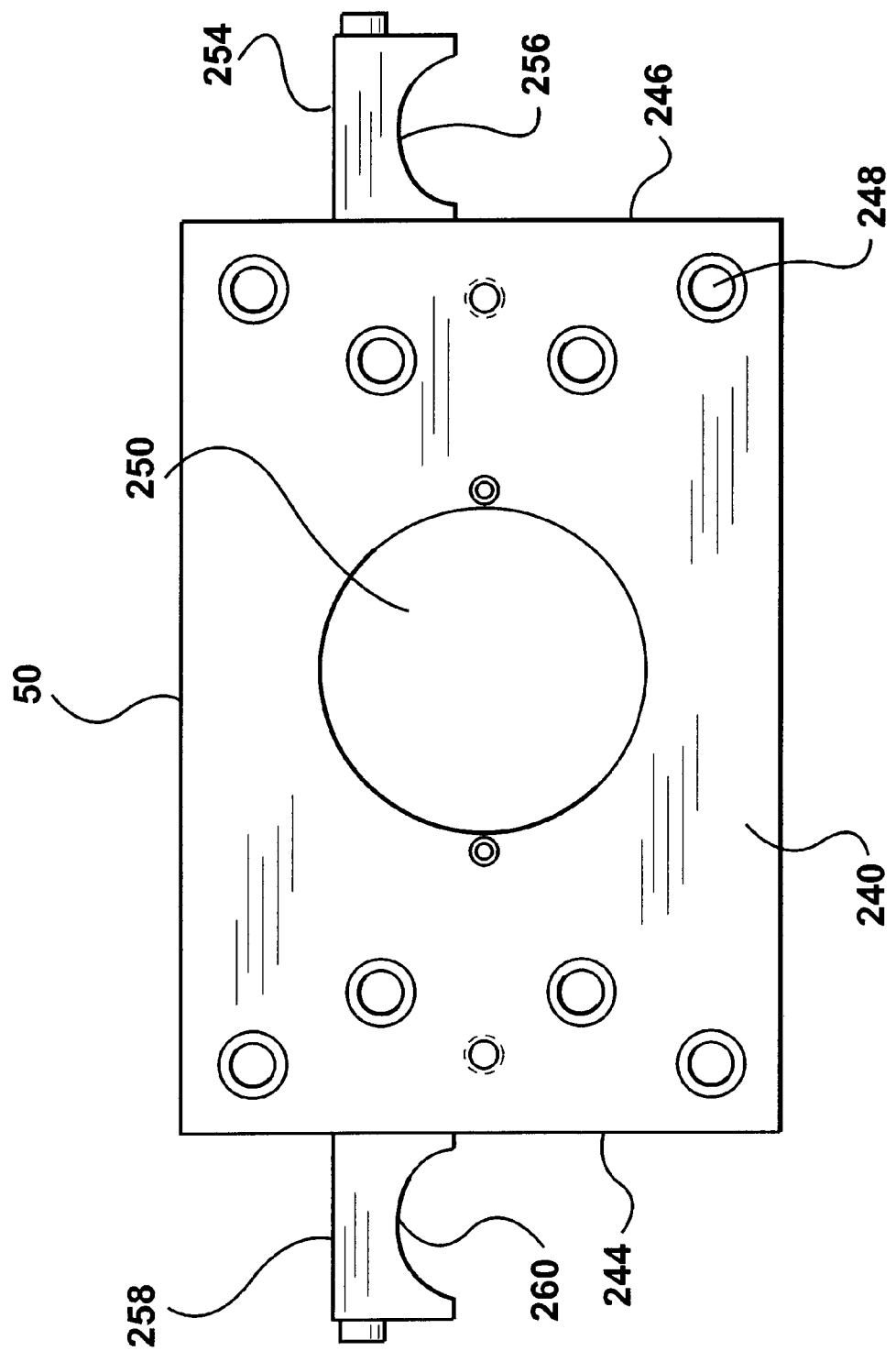
FIG. 15 is a front view of the yoke.
Figure 16:
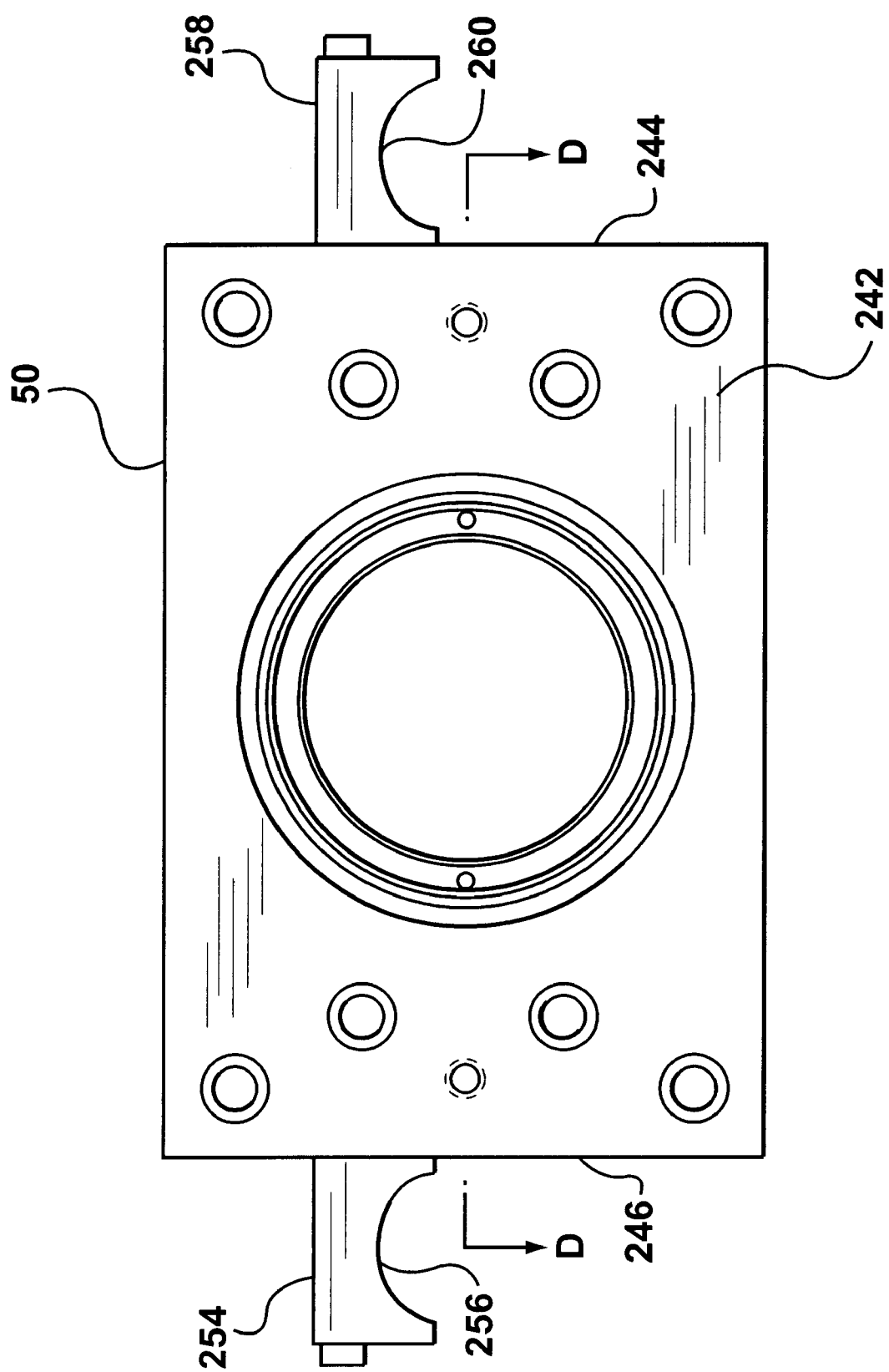
FIG. 16 is a back view of the yoke.
Figure 17:
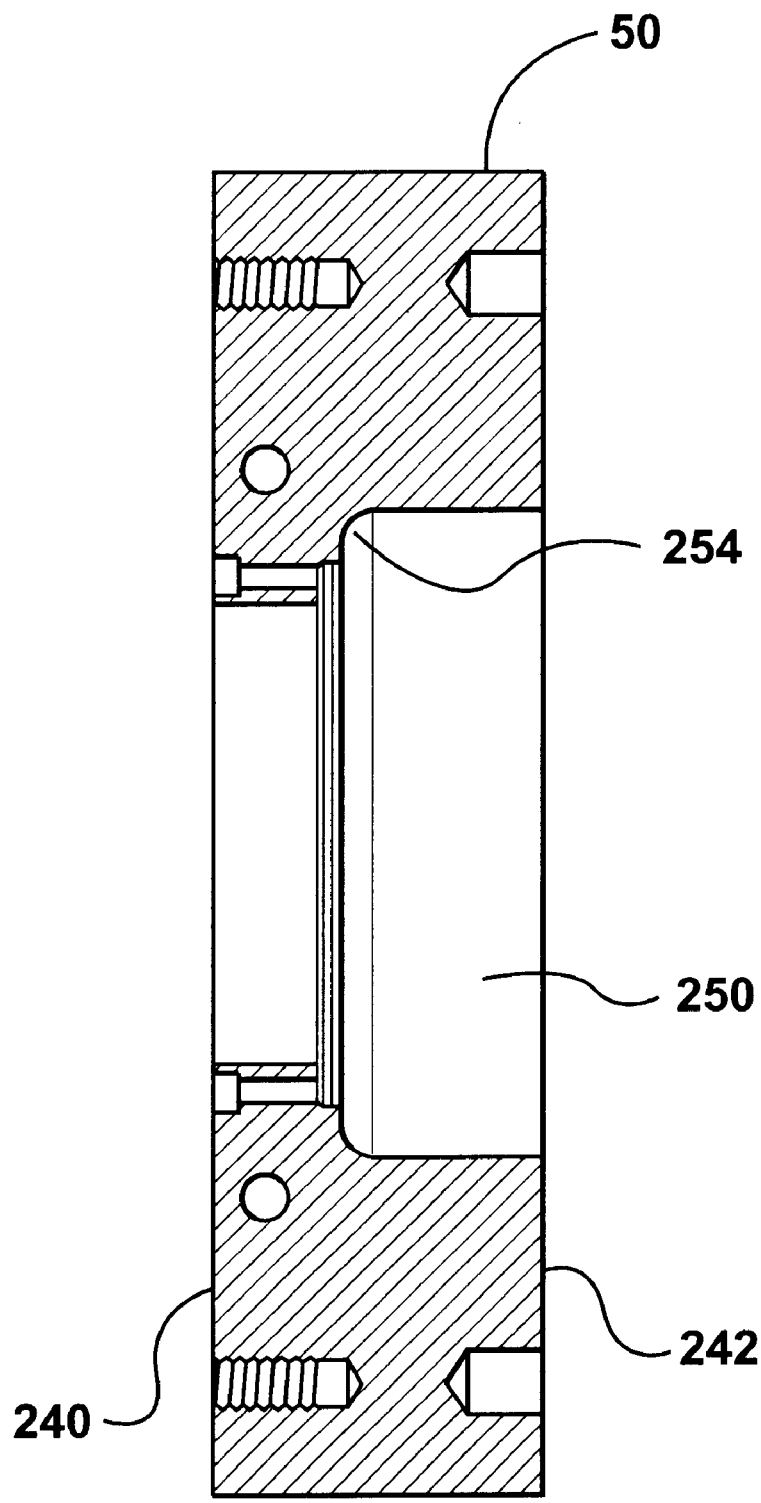
FIG. 17 is a cross sectional side view of the yoke taken along line D—D of FIG. 16.

Referring now to FIGS. 15, 16, and 17, the yoke 50 is further described. The yoke 50 is rectangular having a front face 240, a back face 242, a left side 244, a right side 246, top and bottom. The yoke 50 is of suitable thickness to withstand axial carriage force. The yoke 50 includes a number of openings 248 for receiving bolts to secure the yoke 50 to the yoke mounting surface 230 of the cradle member 52. The central axial bore 250 has a first diameter for receiving the barrel assembly 30 and a second diameter for receiving the barrel coupler 46. The coupling surface of the yoke 50 engages the second axial force linkage member 150. In an embodiment of the invention, the coupling surface is a barrel seat 252 formed between the first diameter and the second diameter. The barrel seat 254 has a cross sectional area to withstand and distribute axial carriage force.

In an embodiment of the invention, the first carriage coupler 152 is formed by the yoke 50 and the first cradle coupler 178 of the cradle member 34.

The yoke 50 includes a pair of yoke supports (254, 258). A first yoke support 254 is mounted on a side of the yoke 50. A second yoke support 258 is mounted on another side of the yoke 50, opposite the first yoke support 254. The yoke supports are axially aligned. The first yoke support 254 includes a supporting surface 256 and the second yoke support 258 includes a supporting surface 260. The supporting surfaces (256, 260) engage complimentary surfaces of the first carriage actuator 56 and the second carriage actuator 58 for supporting the yoke 50 during assembly of the carriage assembly 34.

In an embodiment of the invention, the yoke is plate steel A36 and the cradle assembly is cast from A536. Alternatively, the cradle assembly may be a pair of couplers interconnected by tie bars.

In an alternative embodiment of the invention, the first carriage coupler is interconnected to the second carriage coupler by a plurality of tie bars. In another alternative embodiment of the invention, the first carriage coupler is interconnected to the second carriage coupler by frame member.

Figure 18:
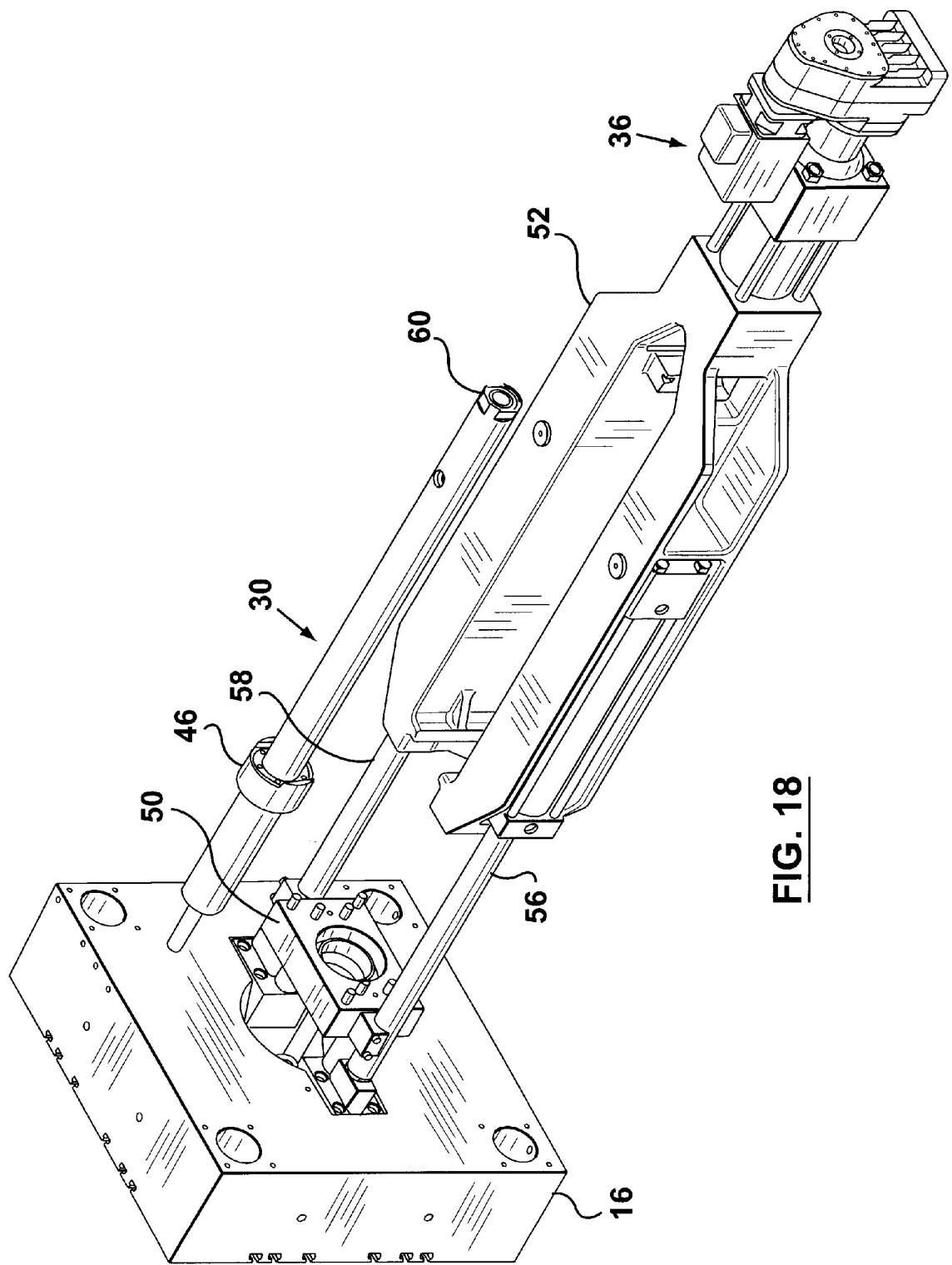
FIG. 18 is a partial perspective view of the barrel assembly and carriage assembly illustrating installation of the barrel assembly within the carriage assembly.
Figure 19:
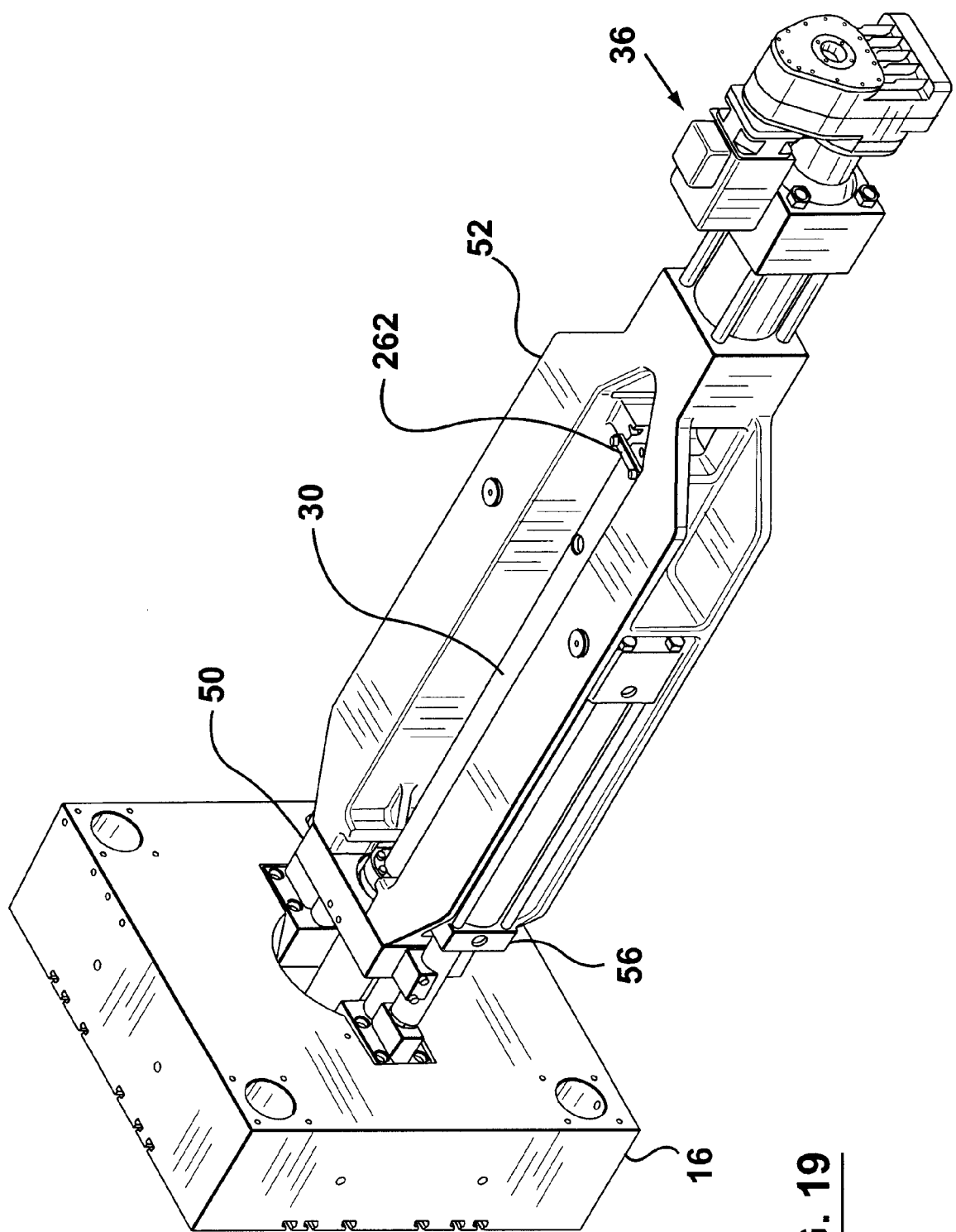
FIG. 19 is a partial perspective view of the barrel assembly and carriage assembly illustrating the barrel assembly installed in the carriage assembly.

Installation of the barrel assembly 30 in the carriage assembly 52 is described with reference to FIGS. 18 and 19. The cradle member 52 is mounted on the frame 28 of the injection unit 14 for axial movement of the injection assembly with respect to the injection unit frame 28 (not shown). The carriage actuator 42 is mounted in the cradle member 52 and connected to a stationary member, for example the stationary platen 16 of the injection molding machine 10. The carriage actuator 42 is operated to move the cradle member 52 away from the stationary platen 16 (see FIG. 18). The yoke 50 is placed on the carriage actuator 42 away from the first end 174 of the cradle member 52. The supporting surface 256 engages one actuator and the supporting surface 260 engages the other actuator.

The barrel assembly 30 is lowered into the opening of the cradle member 34. The first barrel coupler 46 is aligned with the first cradle coupler 178. The second barrel coupler 60 is aligned with the second carriage coupler 148. The barrel assembly 30 is lowered until the barrel assembly 30 engages the first barrel support member 218 and the second barrel support member 200. The barrel support members (218, 200) align the barrel assembly 30 in the cradle member 34.

A rectangular retaining plate 262 (see FIG. 19) engages the support surface 155 of the second barrel coupler 60 for retaining the barrel assembly 30 vertically in the cradle member 52. The plate 262 is secured by conventional bolts to the first and second coupler member (200, 198). A lower surface of the plate 262 engages the support surface 155 permitting axial movement of the barrel assembly 30 in the carriage assembly 34.

The yoke 50 is moved towards the first end 174 of the cradle member 52 and secured to the first end 174 of the cradle member 52 by a number of bolts. A number of alignment pins and openings are provided between the yoke 50 and the yoke mounting surface 230 for aligning the yoke 50 to the cradle assembly 34. The first barrel coupler 46 is effectively secured and clamped to the carriage assembly. The reciprocating screw (located within the axial bore of the barrel assembly) is then connected to the drive assembly 36

Those skilled in the art will appreciate that removal of the barrel assembly 30 from the carriage assembly 52 is the reverse operation of mounting.

Figure 20:
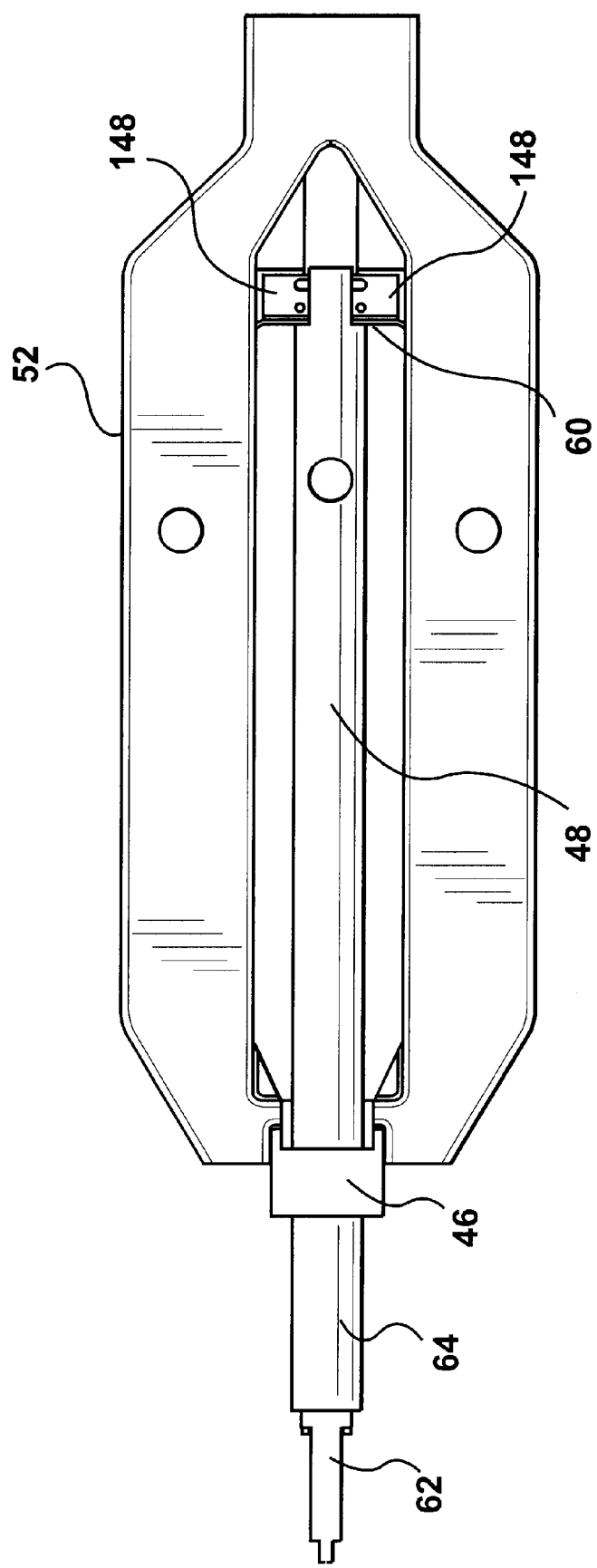
FIG. 20 is a top view of the carriage illustrating the relationship between the second barrel coupler and the second cradle coupler.

Referring now to FIG. 20, the barrel assembly 30 and second barrel coupler 60 are shown mounted in the carriage assembly 34 as a top view without the yoke 50.

The second barrel coupler 60 engages the second carriage coupler 148, retaining the second barrel portion 48 of the barrel assembly 30 to the cradle member 52. The second barrel coupler 60 and the second carriage coupler 148 prevent the barrel assembly 30 from rotating about the longitudinal axis during rotational operation of the screw (not shown). The second barrel coupler 60 and the second carriage coupler 148 permit axial longitudinal movement of the second barrel portion 48 effectively isolating the second barrel portion from axial forces.

Figure 21:
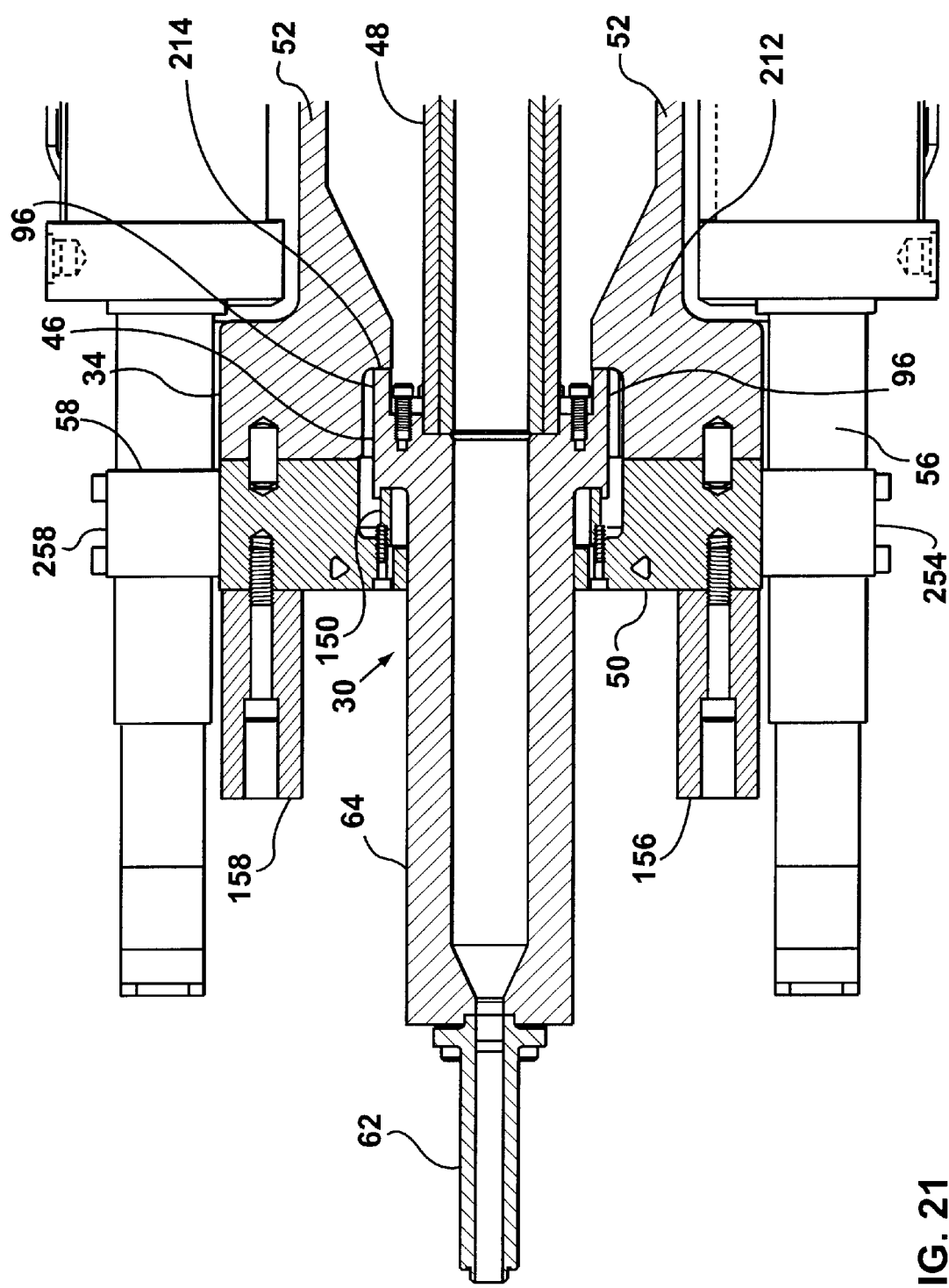
FIG. 21 is a partial top cross sectional view taken along line BB of FIG. 2 illustrating the relationship between the first barrel coupler and the first carriage coupler with a spigot tip nozzle for axial carriage force.

Referring now to FIG. 21, a partial view of the barrel assembly 30 is shown mounted in the carriage assembly 34 as a partial cross sectional view taken along line BB of FIG. 2.

The barrel assembly 30 is housed and secured in the carriage assembly 34. In an embodiment of the invention, the thermal isolator and the first axial force linkage member 96 engages a surface of the first carriage coupler 152. A ring shaped second axial force linkage member 150 is located on a other side of the coupler 46. A thermal isolator surface of the second axial force linkage member 150 engages an inner surface (barrel seat) of the yoke 50. The yoke 50 is located at the front of the carriage assembly 34. The yoke 50 is bolted to a forward section of the carriage assembly 34 to securely clamp the first barrel coupler 46.

The clamping force to secure the barrel assembly 30 with the carriage assembly 34 is provided between the yoke 50 and the carriage assembly 34. The clamping force is directed through the second axial force linkage member 150 (including a thermal isolator), the first barrel coupler 46, and the first axial force linkage member 96 (including a thermal isolator).

In operation, there are two different applications where axial carriage force is directed through the barrel coupler 46. When the nozzle 62 includes a spigot tip 88 (see FIG. 5), the yoke includes a first carriage stop 156 and a second carriage stop 158 (alternatively, a single carriage stop). The first and second stop are mounted by bolts to a front face of the yoke 50. The first and second stop extend outwardly from the front face of the yoke 50 to engage a surface of the stationary platen. The length of the first and second stop is such to permit a length of the spigot tip 88 to enter into the sprue bushing. Operation of the carriage actuator 42 moves the carriage assembly 34 and barrel assembly 30 towards the stationary platen 16 (see FIG. 1) until the first and second stop engage the stationary platen 16 preventing further forward movement. The carriage actuator 42 is further operated to create the axial carriage force. The axial carriage force is directed through the first carriage actuator 56 and the second carriage actuator 58 to the carriage assembly 34. The carriage assembly 34 further directs the axial carriage force through the first carriage coupler 152 to the first axial force linkage member 96, the first barrel coupler 46, the second axial force linkage member 150, the yoke 50, and the first and second stops. This isolates the second barrel portion 48 from axial carriage force.

Figure 22:
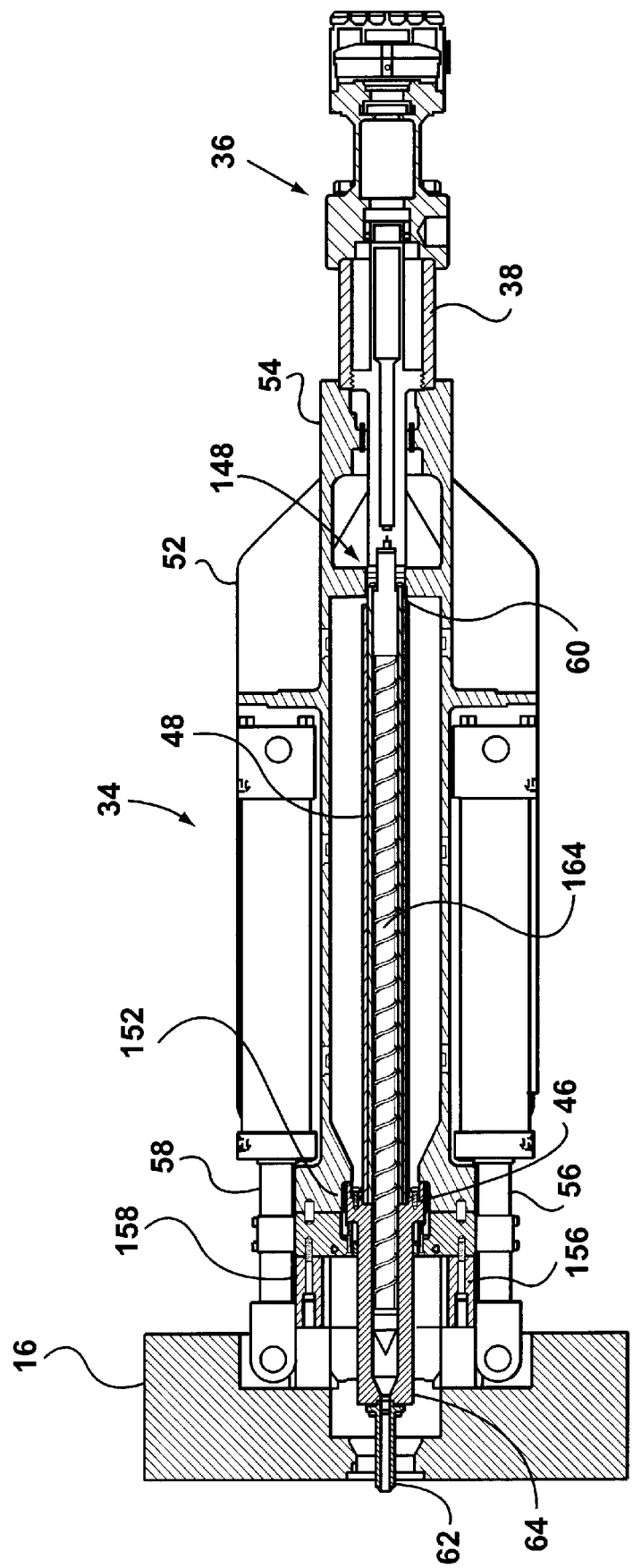
FIG. 22 is a top cross sectional view taken along line BB of FIG. 2 illustrating the relationship between the barrel assembly with a spigot tip nozzle and the carriage assembly for axial reactive injection force.

Referring now to FIG. 22, axial injection force is described. During the injection phase, the screw translation drive 38 is operated to move the screw forward in the barrel assembly 30. An injection force is directed from the translation drive 38 to the reciprocating screw body 164, and to the melt of material located in front of the reciprocating screw. A reactive injection force is directed back through the accumulator 64, to the first barrel coupler 46, (including linkage members) to the first cradle coupler 152, to the first and second carriage actuator housings (170, 172), to the drive mount 54, and to the screw translation drive assembly 30. The second barrel portion is isolated from the axial reactive injection force.

Figure 23:
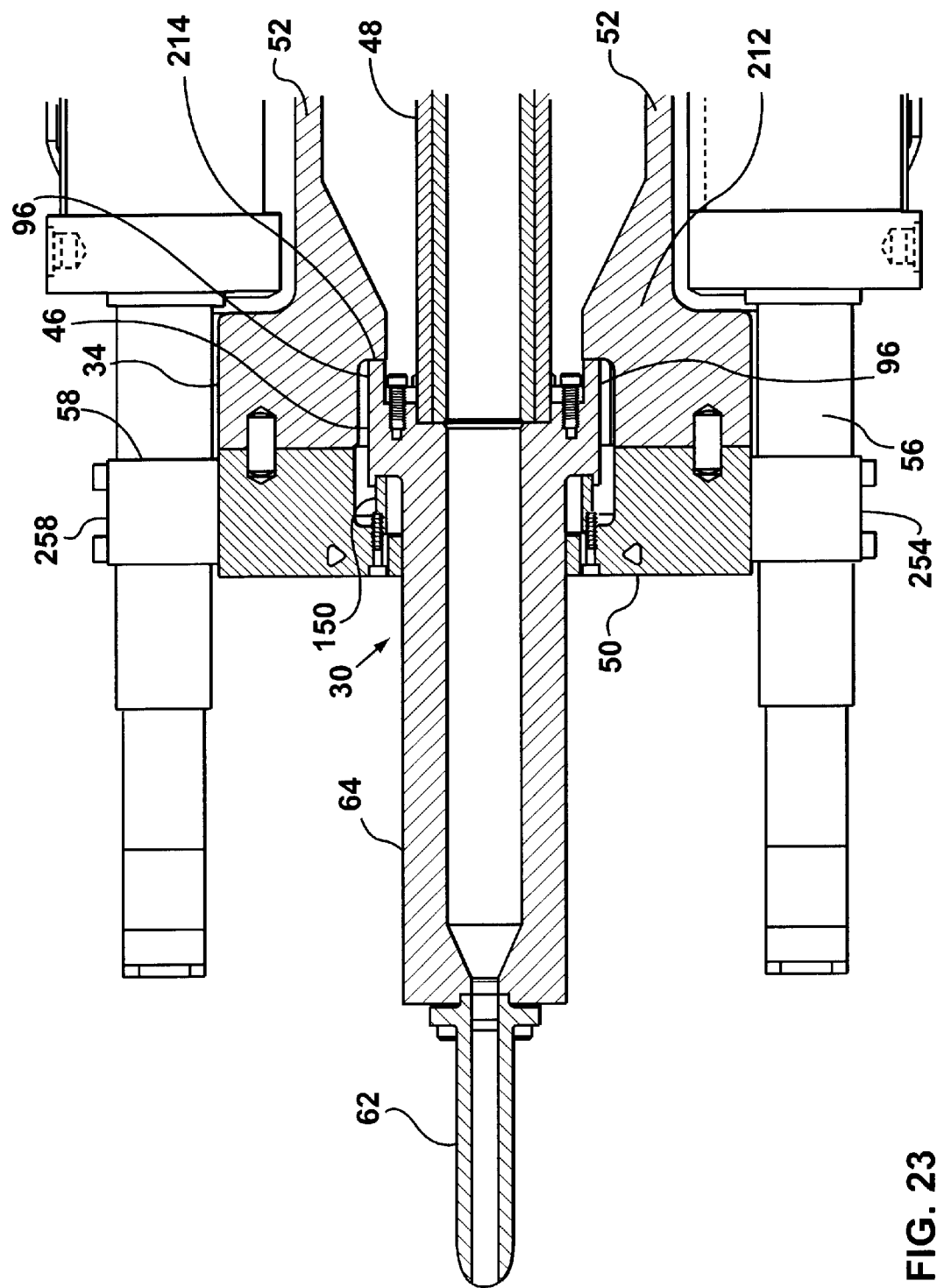
FIG. 23 is a partial top cross sectional view taken along line BB of FIG. 2 illustrating the relationship between the first barrel coupler and the first carriage coupler with a semispherical tip nozzle for axial carriage force.

Referring now to FIG. 23, when the nozzle 62 includes a semispherical tip 90 (see FIG. 6), the first stop 156 and the second stop 158 are not required. Operation of the carriage actuator 42 moves the carriage assembly 34 and barrel assembly 30 towards the stationary platen 16 unit the semispherical tip 90 engages the sprue bushing. The carriage actuator 42 is further operated to create the axial carriage force. The axial carriage force is directed through the first carriage actuator 56 and the second carriage actuator 58 to the carriage assembly 34. The carriage assembly 34 further directs the axial carriage force through the first carriage coupler 152 to the first axial force linkage member 96, the first barrel coupler 46, the accumulator 64, and the nozzle 62. The first barrel portion distributes axial carriage force and the second barrel portion is isolated from axial carriage force.

Figure 24:
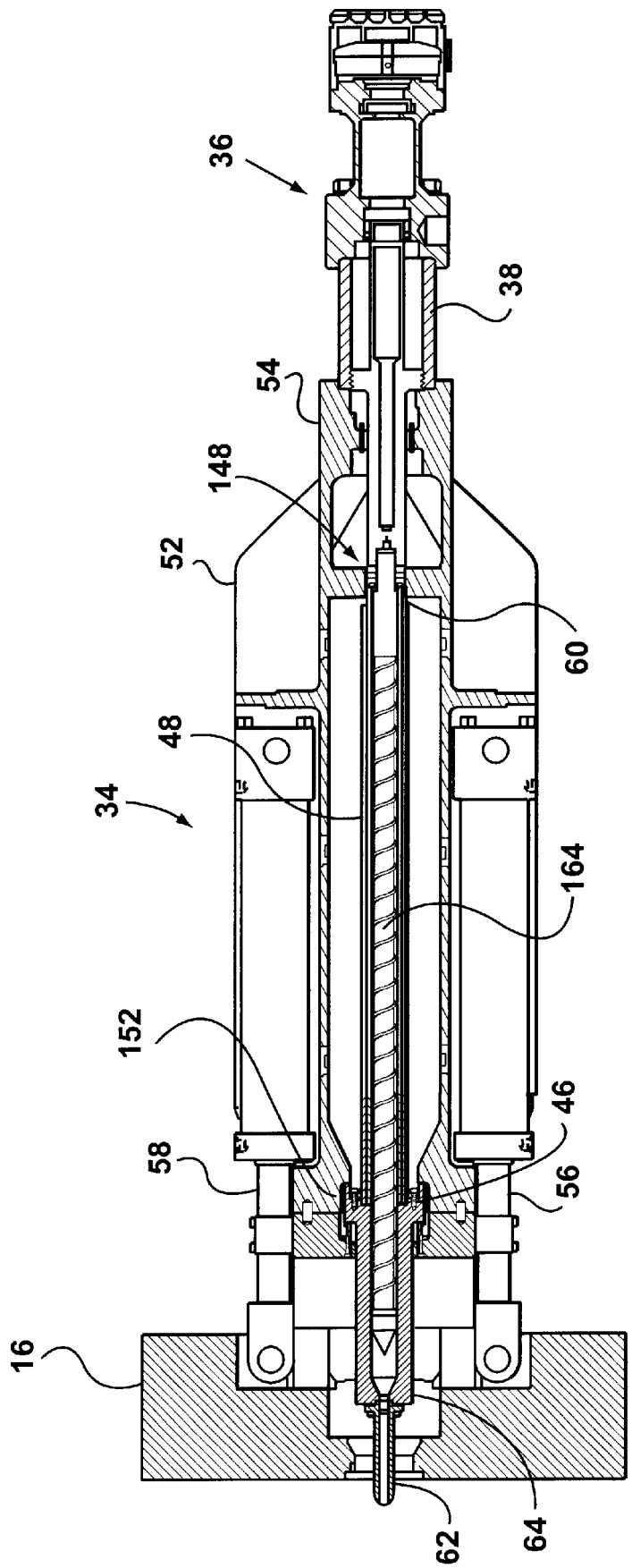
FIG. 24 is a top cross sectional view taken along line BB of FIG. 2 illustrating the relationship between the barrel assembly with a semispherical tip nozzle and the carriage assembly for axial reactive injection force.

Referring now to FIG. 24, axial injection force is described. During the injection phase, the screw translation drive 38 is operated to move the screw forward in the barrel assembly 30. An injection force is directed from the translation drive 38 to the reciprocating screw body 164, and to the melt of material located in front of the reciprocating screw. A first reactive injection force is directed back through the accumulator 64, to the first barrel coupler 46, (including linkage members) to the first cradle coupler 152, to the first and second carriage actuator housings (170, 172), to the drive mount 54, and to the screw translation drive assembly 30. A second reactive injection force is directed back through the nozzle 62 to the accumulator 64, to the first barrel coupler 46, (including linkage members) to the first cradle coupler 152, to the first and second carriage actuator housings (170, 172), to the drive mount 54, and to the screw translation drive assembly 30. The second barrel portion is isolated from the axial reactive injection force.

Figure 25:
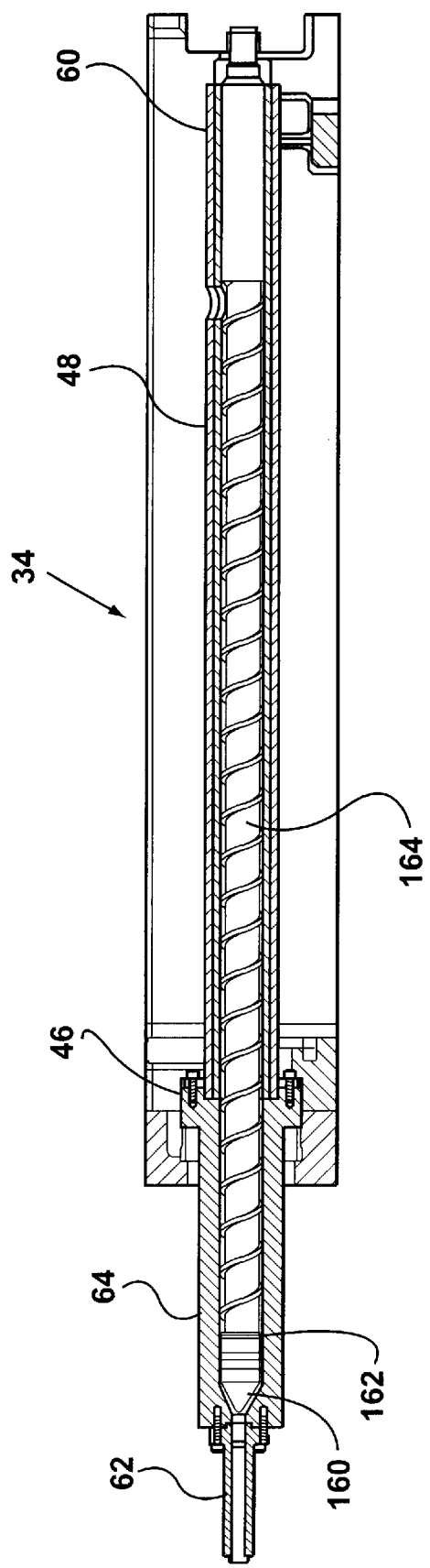
FIG. 25 is a cross sectional view taken along line AA of FIG. 2 illustrating a screw located in the barrel assembly in a first operative position.
Figure 26:
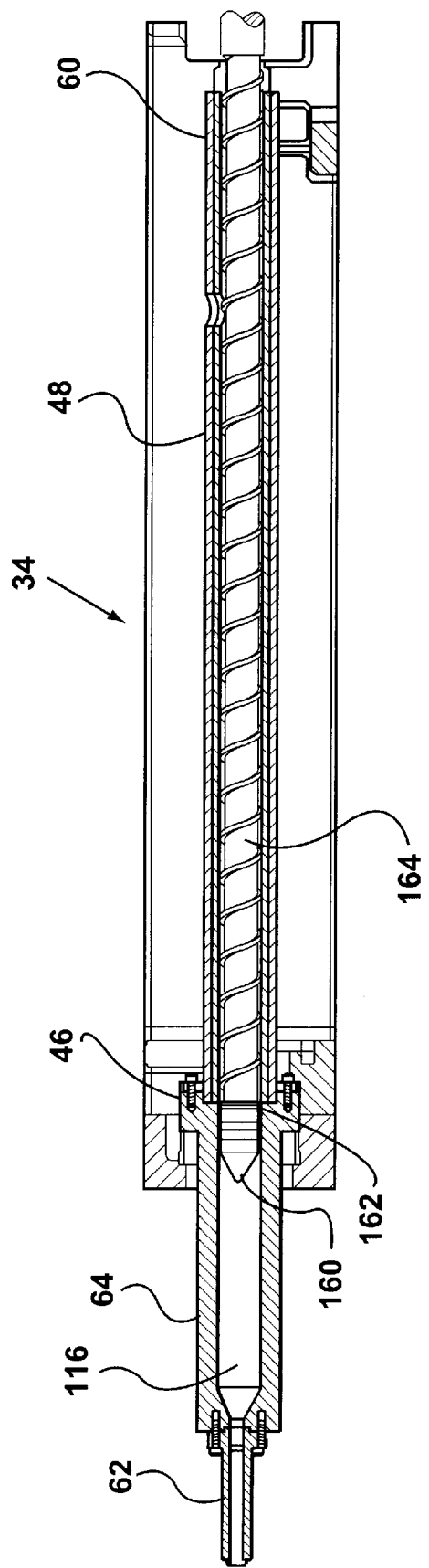
FIG. 26 is a cross sectional view taken along line AA of FIG. 2 illustrating a screw located in the barrel assembly in a second operative position.

Referring now to FIGS. 25 and 26, operation of a screw in a the barrel assembly is described. The barrel assembly, including the nozzle 62, accumulator 64, first barrel coupler 46, second barrel portion 48, and second barrel coupler 60 is secured and retained respectively in the carriage assembly 34 as previously described. A screw is located within the axial bore of the accumulator and the second barrel portion. The screw includes a screw tip 160, a check valve 162, and a reciprocating screw body 164. The screw is reciprocatable between an injected position (see FIG. 13) and a maximum shot position (see FIG. 14).

In operation, the screw starts at the injected position. Feed material enters the axial bore of the barrel assembly through the feed port. The material is melted and conveyed forward along the screw body 164 towards the screw tip 160. As a shot of material develops in front of the screw tip 160 in the accumulation zone of the accumulator 64, the screw moves aft until an appropriate shot volume is received in the accumulator zone. Then, the screw is advanced forward injecting the shot of melt into a mold. The check valve 162 permits the melt to move forward, but not backward of the check valve. In operation, the check valve reciprocates only within the axial bore of the accumulator 64.

In an embodiment of the invention, the barrel assembly is formed by a single unitary construction. In another embodiment, the barrel assembly is a first section connected to a second section. In another embodiment, the first section is a nozzle connected to an accumulator. In another embodiment, the first section is nozzle connected to a barrel head which is connected to an accumulator.

It is to be understood by persons skilled in the art that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. A barrel assembly for use in an injection molding machine comprising:
   a first barrel portion;
   a second barrel portion; and
   a first barrel coupler disposed on said first barrel portion and isolating said second barrel portion from an axial force;
   said barrel assembly having an axial bore.

2. The barrel assembly of claim 1, further comprising:
   a second barrel coupler disposed on said second barrel portion;
   said second barrel coupler permitting axial movement and preventing rotational movement of said barrel assembly mounted in a carriage assembly.

3. The barrel assembly of claim 1, further comprising:
   an axial force linkage member disposed on said first barrel coupler;
   said axial force linkage member distributing said axial force.

4. The barrel assembly of claim 1, further comprising:
   a thermal isolator disposed on said first barrel coupler;
   said thermal isolator thermally reducing conductive heat transfer between said barrel assembly and a carriage assembly.

5. The barrel assembly of claim 1, further comprising:
   a linkage insulator disposed on said first barrel coupler;
   said linkage insulator distributing said axial carriage force and reducing conductive heat transfer between said barrel assembly and a carriage assembly.

6. The barrel assembly of claim 1, further comprising:
   a second barrel coupler disposed on said second barrel portion; and
   a axial force linkage disposed on said first barrel coupler;
   said second barrel coupler permitting axial movement and preventing rotational movement of said barrel assembly mounted in a carriage assembly, and said axial force linkage distributing said axial carriage force.

7. The barrel assembly of claim 1, further comprising:
   a second barrel coupler disposed on said second barrel portion; and
   a thermal isolator disposed on said first barrel coupler;
   said second barrel coupler permitting axial movement and preventing rotational movement of said barrel assembly mounted in a carriage assembly; and
   said thermal isolator reducing conductive heat transfer between said barrel assembly and said carriage assembly.

8. The barrel assembly of claim 1, further comprising:
   an axial force linkage disposed on said first barrel coupler; and
   a thermal isolator disposed on said first barrel coupler;
   said axial force linkage distributing said axial carriage force; and
   said thermal isolator reducing conductive heat transfer between said barrel assembly and a carriage assembly.

9. The barrel assembly of claim 1, further comprising:
   a second barrel coupler disposed on said second barrel portion; and
   a linkage insulator disposed on said first barrel coupler;
   said second barrel coupler permitting axial movement and preventing rotational movement of said barrel assembly mounted in a carriage assembly, and
   said barrel linkage insulator distributing said axial carriage force and reducing conductive heat transfer between said barrel assembly and said carriage assembly.

10. The barrel assembly of claim 1, further comprising:
    an axial force linkage and a linkage insulator, both disposed on said first barrel coupler;
    said axial force linkage distributing said axial carriage force; and
    said linkage insulator distributing said axial carriage force and reducing conductive heat transfer between said barrel assembly and a carriage assembly.

11. The barrel assembly of claim 1, further comprising:
    a thermal isolator and a linkage insulator, both disposed on said first barrel coupler;
    said thermal isolator reducing conductive heat transfer between said barrel assembly and a carriage assembly; and
    said linkage insulator distributing said axial carriage force and reducing conductive heat transfer between said barrel assembly and said carriage assembly.

12. The barrel assembly of claim 1, further comprising:
    a second barrel coupler disposed on said second barrel portion;
    an axial force linkage and a thermal isolator, both disposed on said first barrel coupler;
    said second barrel coupler permitting axial movement and preventing rotational movement of said barrel assembly mounted in a carriage assembly;
    said axial force linkage distributing said axial carriage force; and
    said thermal isolator reducing conductive heat transfer between said barrel assembly and said carriage assembly.

13. The barrel assembly of claim 1, further comprising:
    an axial force linkage, a thermal isolator, and a linkage insulator, all disposed on said first barrel coupler;
    said axial force linkage distributing said axial carriage force;
    said thermal isolator reducing conductive heat transfer between said barrel assembly and a carriage assembly; and
    said barrel linkage insulator distributing said axial carriage force and thermally isolating said barrel assembly from said carriage assembly.

14. The barrel assembly of claim 1, further comprising:
    a second barrel coupler disposed on said second barrel portion;

an axial force linkage and a linkage insulator, both disposed on said first barrel coupler;

said second barrel coupler permitting axial movement and preventing rotational movement of said barrel assembly mounted in a carriage assembly;

said axial force linkage distributing said axial carriage force; and said linkage insulator distributing said axial carriage force and reducing conductive heat transfer between said barrel assembly and said carriage assembly.

15. The barrel assembly of claim 1, further comprising:

a second barrel coupler disposed on said second barrel portion;

a thermal isolator and a linkage insulator, both disposed on said first barrel coupler;

said second barrel coupler permitting axial movement of said barrel assembly and preventing rotational movement of said barrel assembly mounted in a carriage assembly;

said thermal isolator reducing conductive heat transfer between said barrel assembly and said carriage assembly; and said linkage insulator distributing said axial carriage force and reducing conductive heat transfer between said barrel assembly and said carriage assembly.

16. The barrel assembly of claim 1, further comprising:

a second barrel coupler disposed on said second barrel portion;

a thermal isolator, an axial force linkage, and a linkage insulator, all disposed on said first barrel coupler;

said second barrel coupler permitting axial movement and preventing rotational movement of said barrel assembly mounted in a carriage assembly;

said axial force linkage distributing said axial carriage force;

said thermal isolator reducing conductive heat transfer between said barrel assembly and said carriage assembly; and said linkage insulator distributing said axial carriage force and reducing conductive heat transfer between said barrel assembly and said carriage assembly.

17. The barrel assembly of claim 2, 6, 7, 9, 12, 14, 15, or 16, wherein there are a plurality of said second barrel couplers.

18. The barrel assembly of claim 17 wherein at least one of said second barrel couplers is an interlocking member, formed in an outer surface of said second barrel portion.

19. The barrel assembly of claim 18, wherein said interlocking member is a substantially flat pad.

20. The barrel assembly of claim 18, wherein said interlocking member is a spline.

21. The barrel assembly of claim 18, wherein said interlocking member is an axially aligned slot.

22. The barrel assembly of claim 17, wherein said second barrel coupler is retained on said second barrel portion.

23. The barrel assembly of claim 3, 6, 8, 10, 12, 13, 14, or 16 wherein there are a plurality of said axial force linkage members.

24. The barrel assembly of claim 23, wherein at least one of said axial force linkage members is of unitary construction with said first barrel coupler.

25. The barrel assembly of claim 23, wherein at least one of said axial force linkage members is retained to said first barrel coupler.

26. The barrel assembly of claim 4, 7, 8, 11, 12, 13, 15, or 16 wherein there are a plurality of said thermal isolators.

27. The barrel assembly of claim 26, wherein at least one of said thermal isolators is of unitary construction with said first barrel coupler.

28. The barrel assembly of claim 26, wherein at least one of said thermal isolator is retained to said first barrel coupler.

29. The barrel assembly of claim 5, 9, 10, 11, 13, 14, 15, or 16 wherein there are a plurality of said linkage insulators.

30. The barrel assembly of claim 29, wherein at least one of said linkage insulators is of unitary construction with said first barrel coupler.

31. The barrel assembly of claim 29, wherein at least one of said linkage insulators is retained to said first barrel coupler.

32. The barrel assembly of claim 18, 22, 24, 25, 27, 28, 30, or 31, further comprising:

a liner retained within said axial bore;

said liner isolating and protecting said barrel assembly from mechanical or chemical degradation related to a melt of material.

33. The barrel assembly of claim 18, 22, 24, 25, 27, 28, 30, or 31, further comprising:

a feed throat on said second barrel portion for introducing feed material.

34. The barrel assembly of claim 18, 22, 24, 25, 27, 28, 30, or 31, further comprising:

a reciprocating screw located within said axial bore;

said reciprocating screw being operable for transporting feed material.

35. The barrel assembly of claim 18, 22, 24, 25, 27, 28, 30, or 31, wherein said barrel assembly is of a unitary construction.

36. The barrel assembly of claim 18, 22, 24, 25, 27, 28, 30, or 31, wherein said barrel assembly is an assembly of a plurality of barrel sections.

37. The barrel assembly of claim 36, wherein each of said barrel sections include a flange at each end that, in cooperation with a plurality of fasteners, retain adjacent barrel sections.

38. The barrel assembly of claim 37, wherein each of said flanges are of a unitary construction on said barrel section.

39. The barrel assembly of claim 37, wherein each of said flanges are retained on said barrel section.

40. The barrel assembly of claim 39, wherein each of said flanges are threaded on said barrel.

41. The barrel assembly of claim 36, wherein each of said barrel sections are threadably connected.

42. The barrel assembly of claim 37, wherein said adjacent barrel sections are retained by welding.

43. The barrel assembly of claim 37, wherein adjacent said barrel sections are clamped.

44. The barrel assembly of claim 37, wherein a seal is disposed between said adjacent barrel sections to prevent leakage of melt of material.

45. The barrel assembly of claim 18, 22, 24, 25, 27, 28, 30, or 31, wherein said first barrel coupler is of a unitary construction with said first barrel portion.

46. The barrel assembly of claim 18, 22, 24, 25, 27, 28, 30, or 31, wherein said first barrel coupler is retained to said first barrel portion.

47. The barrel assembly of claim 1, 2, 3, 4, 5, 6, 7, 8, 9, 10, 11, 12, 13, 14, 15, or 16 wherein said first barrel coupler prevents rotation of said barrel assembly.

48. The barrel assembly of claim 1, wherein said first barrel portion comprises an accumulator connected with a nozzle, said first coupler being disposed on said accumulator.

* * * * *